United States Patent
Lee et al.

(10) Patent No.: US 9,733,523 B2
(45) Date of Patent: Aug. 15, 2017

(54) EXPOSURE APPARATUS AND EXPOSURE METHOD USING THE SAME

(71) Applicant: Samsung Display CO., LTD., Yongin, Gyeonggi-Do (KR)

(72) Inventors: Yeon-Jae Lee, Suwon-si (KR); Min-Soo Kim, Suwon-si (KR); Tae-Jin Kim, Busan (KR); Hee-Chang Yang, Asan-si (KR); Eun-Ho Jung, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 211 days.

(21) Appl. No.: 14/289,510

(22) Filed: May 28, 2014

(65) Prior Publication Data

US 2015/0194231 A1    Jul. 9, 2015

(30) Foreign Application Priority Data

Jan. 9, 2014    (KR) ........................ 10-2014-0002709

(51) Int. Cl.
*G21K 5/08* (2006.01)
*G02F 1/1337* (2006.01)
*G02F 1/13* (2006.01)

(52) U.S. Cl.
CPC ...... *G02F 1/133788* (2013.01); *G02F 1/1303* (2013.01)

(58) Field of Classification Search
CPC ......... G02F 1/133788; G02F 1/133753; G02F 1/1303; G02F 1/133365; G02F 1/133634; G02F 1/133711; G02F 1/134309; G02F 1/1345; G02F 2001/133742; G02F 2001/133757; C08F 122/105; C08F 22/10; C08F 2500/02
USPC ....... 349/123, 124, 142, 167, 178, 187, 191; 356/400, 401; 204/157.15, 157.69,
(Continued)

(56) References Cited

U.S. PATENT DOCUMENTS

| | | | | |
|---|---|---|---|---|
| 6,061,138 A | * | 5/2000 | Gibbons | ........... G02F 1/133788 356/400 |
| 6,307,609 B1 | * | 10/2001 | Gibbons | ........... G02F 1/133788 349/123 |
| 6,771,341 B2 | | 8/2004 | Ohkouchi et al. | |

(Continued)

FOREIGN PATENT DOCUMENTS

| | | |
|---|---|---|
| JP | 4506412 | 5/2010 |
| KR | 10-2001-0022603 | 3/2001 |

(Continued)

*Primary Examiner* — Edward Chin
(74) *Attorney, Agent, or Firm* — Innovation Counsel LLP

(57) ABSTRACT

An exposure method includes loading a first substrate on a loading portion, the first substrate having a photo alignment agent which is coated on the first substrate, irradiating the first substrate by moving the first substrate in a first speed in a first direction to a working portion while loading a second substrate on the loading portion, the working portion having an ultra violet light source generating ultra violet ray to harden a photo alignment agent, simultaneously irradiating the first substrate and the second substrate by moving the first substrate and the second substrate in the first direction in the working portion, and unloading the first substrate from an unloading portion while irradiating the second substrate by moving the second substrate in the first direction in the working portion.

10 Claims, 42 Drawing Sheets

(58) Field of Classification Search
USPC ............ 204/157.81, 157.87, 157.93, 158.14, 204/192.29; 355/67; 430/20, 320
See application file for complete search history.

(56) References Cited

U.S. PATENT DOCUMENTS

| | | | | |
|---|---|---|---|---|
| 6,882,416 | B1* | 4/2005 | Hunter | G01N 21/8851 356/237.4 |
| 7,133,112 | B1* | 11/2006 | Choi | G02F 1/133753 349/123 |
| 7,413,317 | B2 | 8/2008 | Solomon et al. | |
| 7,463,418 | B2 | 12/2008 | Shioya | |
| 8,190,281 | B2* | 5/2012 | Yokouchi | G05B 19/41865 700/102 |
| 2004/0008310 | A1* | 1/2004 | Leidig | G02F 1/133634 349/124 |
| 2004/0139914 | A1* | 7/2004 | Yamazaki | C23C 14/12 118/719 |
| 2010/0225864 | A1* | 9/2010 | Inoue | G02F 1/133788 349/123 |
| 2010/0249993 | A1* | 9/2010 | Mitsuyoshi | H01L 21/67742 700/228 |
| 2012/0293763 | A1* | 11/2012 | Inoue | G02F 1/133788 349/178 |
| 2013/0293819 | A1* | 11/2013 | Liao | G02F 1/1345 349/142 |
| 2014/0160457 | A1* | 6/2014 | Kao | G03F 7/70775 355/77 |
| 2014/0360860 | A1* | 12/2014 | Miyachi | G02F 1/133788 204/157.69 |

FOREIGN PATENT DOCUMENTS

| | | |
|---|---|---|
| KR | 10-2006-0099272 | 9/2006 |
| KR | 10-0738810 | 7/2007 |
| KR | 10-0899174 | 5/2009 |
| KR | 10-2009-0112546 | 10/2009 |
| WO | 99/08148 | 2/1999 |

* cited by examiner

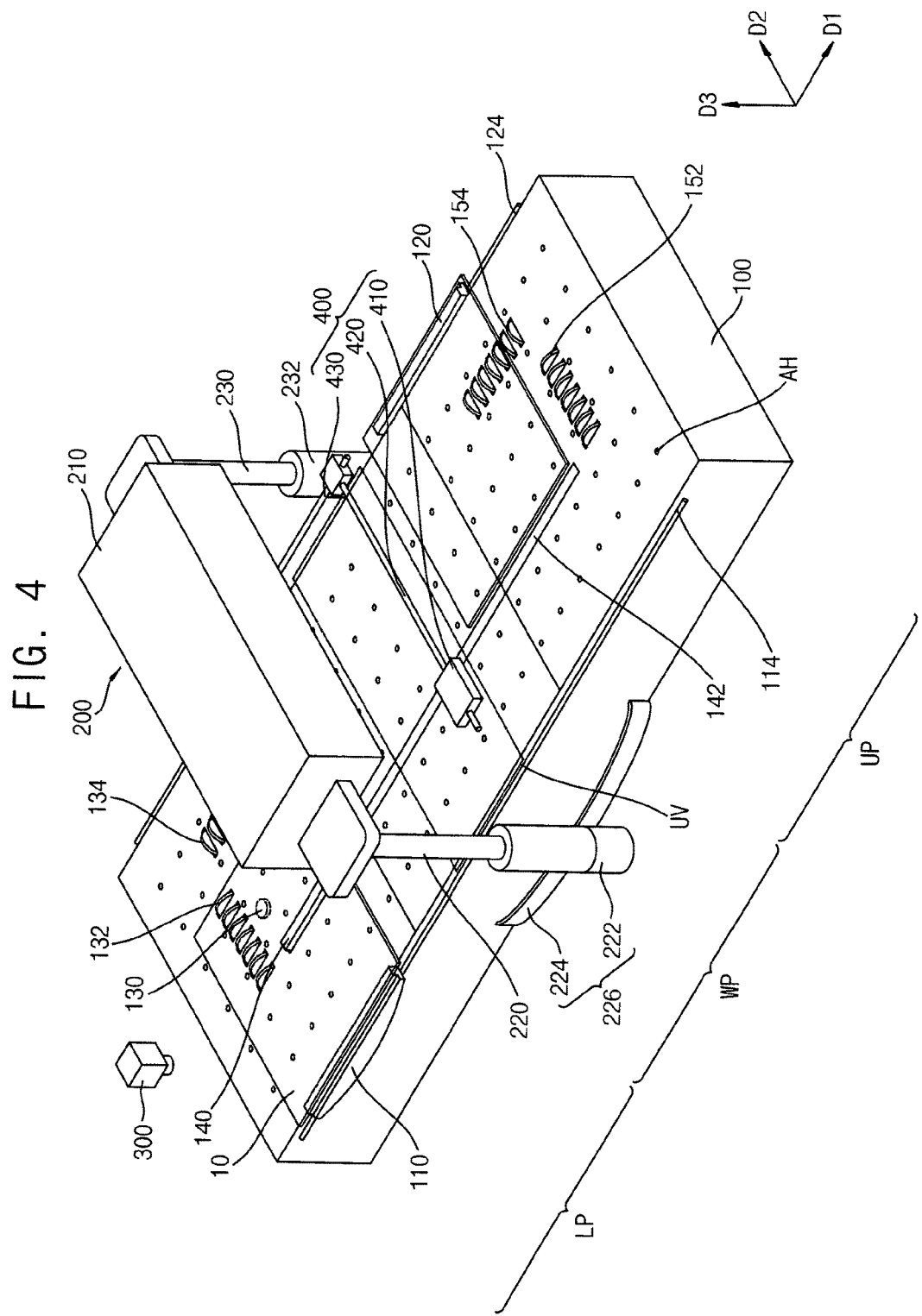

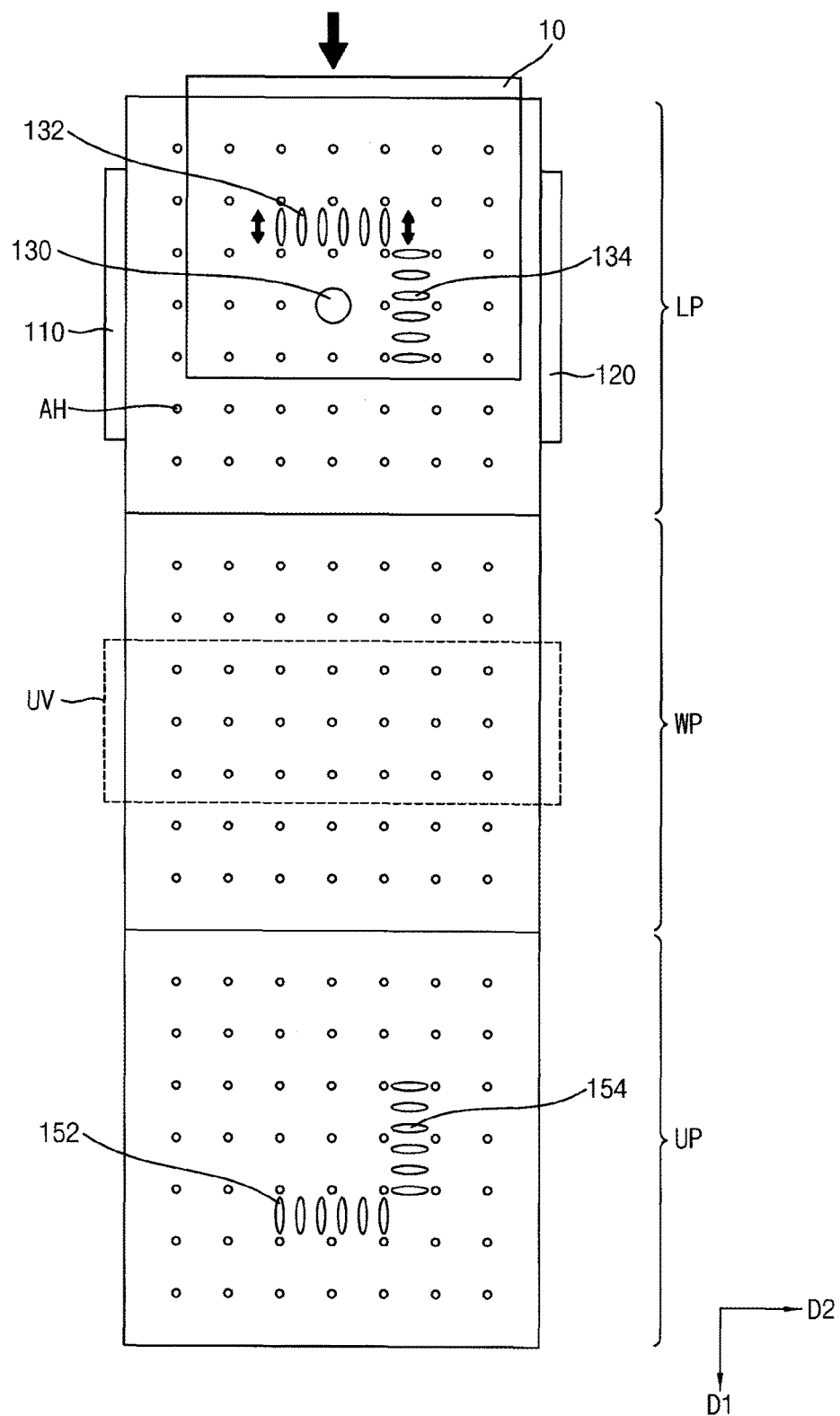

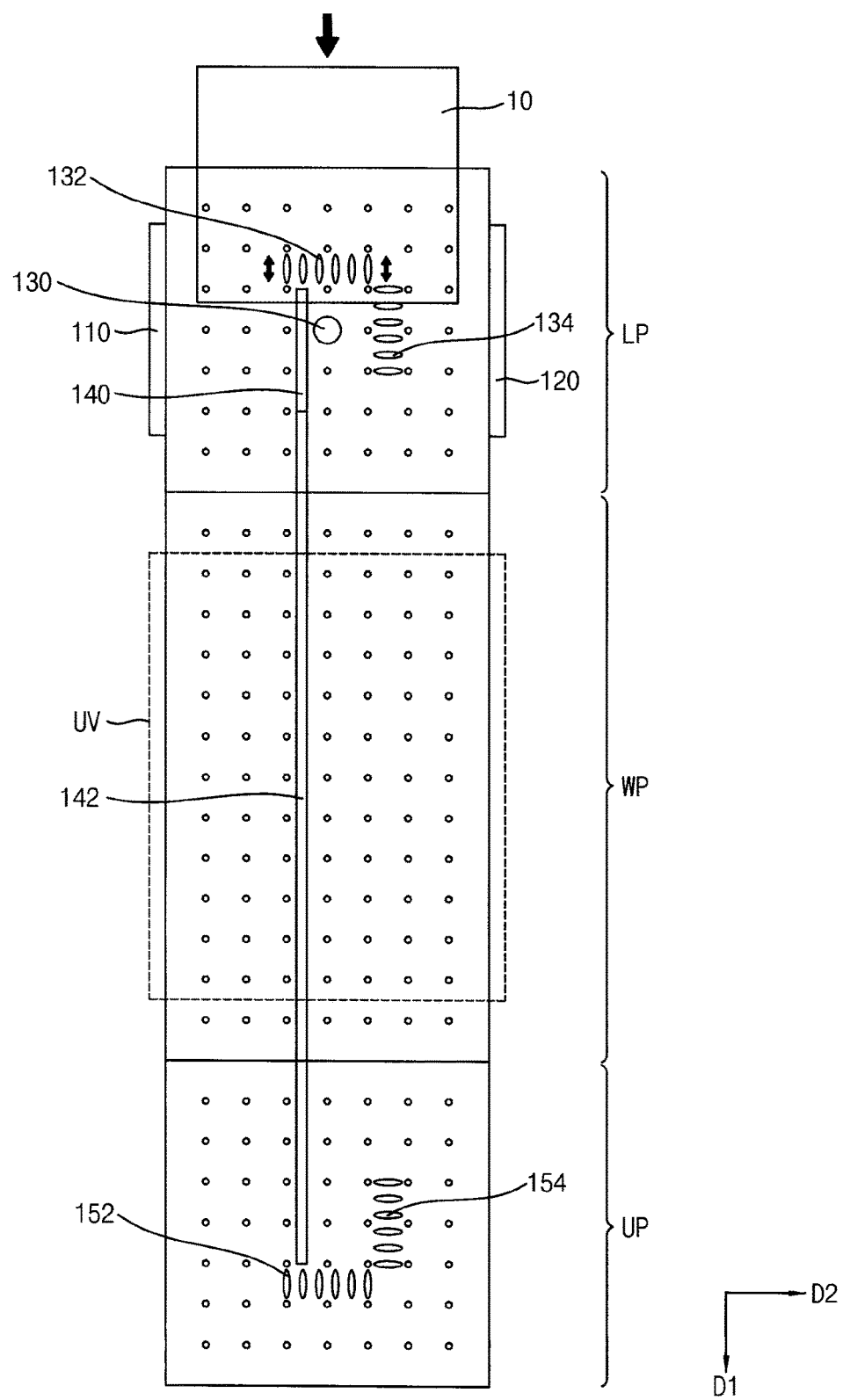

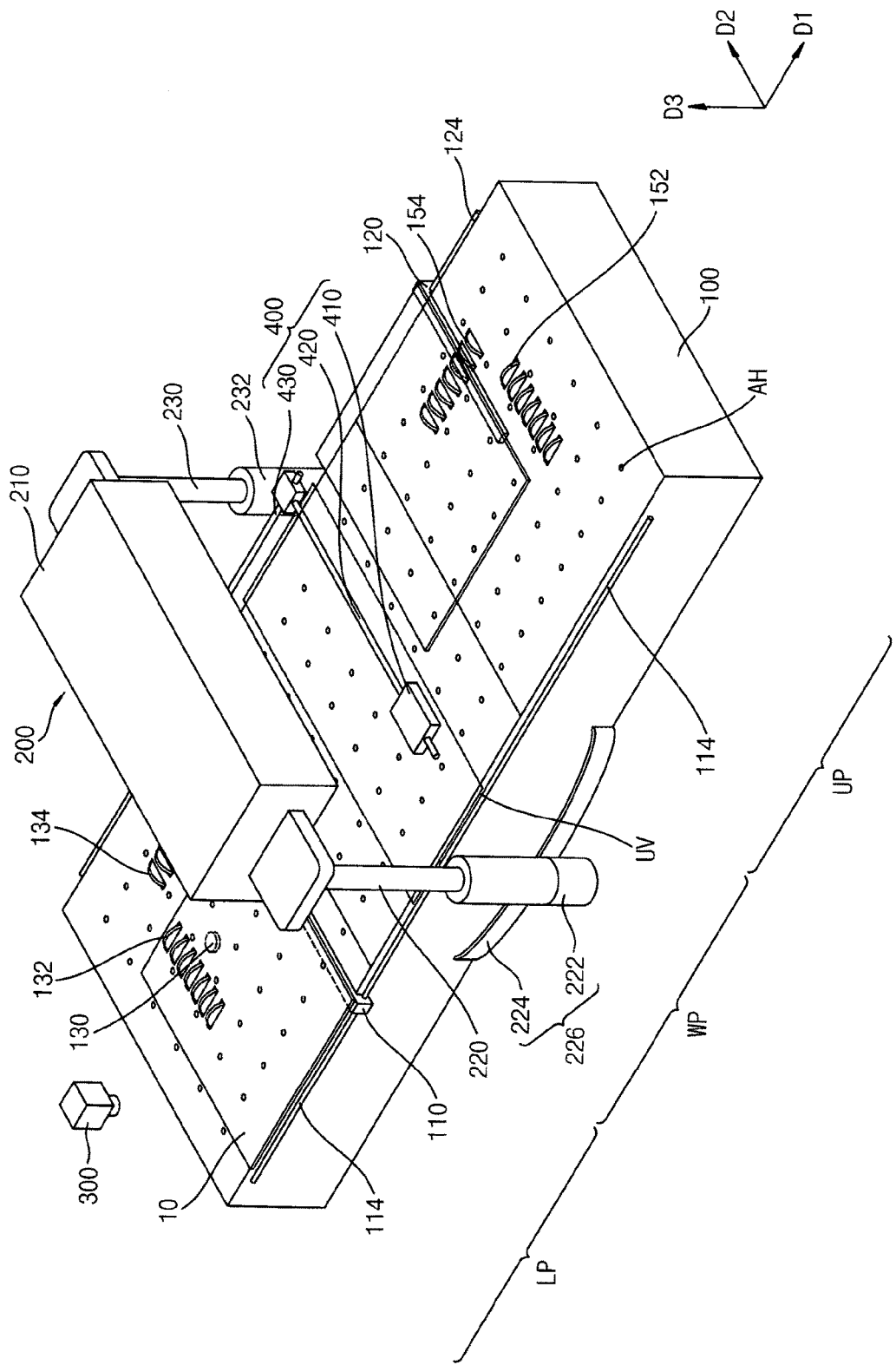

EXPOSURE APPARATUS AND EXPOSURE METHOD USING THE SAME

This application claims priority under 35 U.S.C. §119 to Korean Patent Application No. 10-2014-0002709, filed on Jan. 9, 2014, the disclosure of which is incorporated by reference herein in its entirety.

BACKGROUND

1. Field

Exemplary embodiments of the inventive concept relate to an exposure apparatus and an exposure method of using the exposure apparatus.

More particularly, exemplary embodiments of the inventive concept relate to an exposure apparatus for forming a light alignment layer and an exposure method of using the exposure apparatus.

2. Description of the Related Art

Recently, a display apparatus having light weight and small size has been manufactured. A cathode ray tube (CRT) display apparatus has been used due to a performance and a competitive price. However the CRT display apparatus is hard to make a thin and light display. Thus, the CRT is not suitable for portable device such as smart phone, Note PC, etc. Therefore the display apparatus such as a plasma display apparatus, a liquid crystal display apparatus and an organic light emitting display apparatus has been spotlighted due to small size, light weight and low-power-consumption.

The display apparatus includes an array substrate having a circuit wiring, an opposite substrate facing the array substrate and a liquid crystal layer disposed between the array substrate and the opposite substrate. The display apparatus further includes an alignment layer to give liquid crystal molecules of the liquid crystal layer a pre-tilt angle. The alignment layer may be formed by a photo-alignment process which uses polarized light having specific wave length to make an alignment layer for aligning a liquid crystal layer using an exposure apparatus. The photo-alignment process takes too long time to form an alignment layer.

SUMMARY

One or more exemplary embodiment of the inventive concept provides an exposure apparatus capable of improving a light efficiency and a process time.

One or more exemplary embodiments of the inventive concept also provide an exposure method using the exposure apparatus.

According to an exemplary embodiment of the inventive concept, an exposure method includes loading a first substrate on a loading portion, the first substrate having a photo alignment agent which is coated on the first substrate, irradiating the first substrate by moving the first substrate in a first speed in a first direction to a working portion while loading a second substrate on the loading portion, the working portion having an ultra violet light source generating ultra violet ray to harden a photo alignment agent, simultaneously irradiating the first substrate and the second substrate by moving the first substrate and the second substrate in the first direction in the working portion, and unloading the first substrate from an unloading portion while irradiating the second substrate by moving the second substrate in the first direction in the working portion.

In an exemplary embodiment, the exposure method may further include moving the first substrate in a second speed in the first direction, the second speed being faster than the first speed, between loading the first substrate and irradiating the first substrate.

In an exemplary embodiment, the exposure method may further include moving the first substrate in a third speed in the first direction , the third speed being faster than the first speed between irradiating the first and second substrates, and unloading the first substrate while irradiating the second substrate.

In an exemplary embodiment, the first and second substrates may be irradiated in an exposure area disposed in the working portion which is between the loading portion and the unloading portion. The loading portion, the working portion and the unloading portion may be disposed in the first direction in order.

In an exemplary embodiment, the first and second substrates may be transferred by an air floating stage. First and second grippers hold the first and second substrates to transfer the first and second substrates.

In an exemplary embodiment, loading the first substrate may include moving the first substrate in a second direction substantially perpendicular to the first direction to place the first substrate on the first gripper and to place a side of the first substrate in parallel with the first direction, and aligning the first substrate by rotating the first substrate in a plane which formed by the first and second directions.

In an exemplary embodiment, loading the first substrate may further include, after aligning the first substrate, rotating the first substrate in the plane to form a predetermined angle between the side of the first substrate and the first direction.

In an exemplary embodiment, the first substrate may be loaded on a first gripper and the second substrate is loaded on a second gripper.

In an exemplary embodiment, the exposure method may further include irradiating the second substrate by moving the second substrate in the first direction while loading a third substrate on the loading portion.

In an exemplary embodiment, the exposure method may further include irradiating the third substrate by moving the third substrate in the first direction while loading a fourth substrate on the loading.

According to an exemplary embodiment of the inventive concept includes a stage including a loading portion to load a substrate, a working portion disposed adjacent to the loading portion in a first direction, the working portion including an exposure part including a light source part, the light source part being configured to generate ultra violet ray, and an unloading portion disposed adjacent to the working portion in the first direction to unload the substrate, a first gripper to move the substrate in the first direction on the stage; and a second gripper to move the substrate in the first direction on the stage.

In an exemplary embodiment, the first gripper may be disposed adjacent to a first side of the stage in a second direction which is substantially perpendicular to the first direction. The second gripper may be disposed adjacent to a second side of the stage in the second direction. The second side of the stage may be opposite to the first side of the stage.

In an exemplary embodiment, a plurality of air holes to form air cushion may be formed on the stage, and each of the first and second gripper comprises an absorbing part comprising a porous material to form a vacuum, the first and second grippers being configured to hold the substrate to transfer the substrate.

In an exemplary embodiment, the exposure part may include a tilt part including a driving part and a guide rail, the tilt part being configured to tilt the light source part with respect to the first direction.

In an exemplary embodiment, the loading portion may include a first loading roller having a rotation axis which is in parallel with a second direction substantially perpendicular to the first direction and being configured to contact with the substrate to move the substrate in the first direction, a second loading roller having a rotation axis which is in parallel with the first direction and being configured to contact with the substrate to move the substrate in the second direction, and a substrate rotator configured to be attached to the substrate to rotate the substrate in a plane which the first and second directions form.

In an exemplary embodiment, the unloading portion may include a first unloading roller having a rotation axis which is in parallel with the second direction and being configured to contact with the substrate to move the substrate in the first direction, and a second unloading roller having a rotation axis which is in parallel with the first direction and being configured to contact with the substrate to move the substrate in the second direction.

In an exemplary embodiment, the exposure apparatus may further include a third gripper disposed between the first gripper and the second gripper, and moving the substrate in the first direction.

In an exemplary embodiment, the first and second grippers may hold front portion of the substrate with respect to the first direction to move the substrate.

In an exemplary embodiment, the exposure apparatus may further include a polarization measuring part disposed between the exposure part and the stage to measure amount of the ultra violet ray from the exposure part and polarization direction According to an exemplary embodiment of the inventive concept, the exposure method includes sequentially loading a plurality of substrates on a respective plurality of carriers, the substrates having a photo alignment agent which is coated on the substrate, irradiating the plurality of substrates with polarized ultra violet ray to harden the photo alignment agent by continuously moving the plurality of substrates in a first direction, and unloading the plurality of substrates. The irradiating the plurality of substrates comprises irradiating at least two consecutive substrates at the same time.

According to the present inventive concept, an exposure apparatus includes first and second grippers which continuously transfer a plurality of substrates, the substrates may be transferred in a first direction in order and irradiated.

In addition, an exposure method using the exposure apparatus includes a step that two continuous substrates are simultaneously irradiated, so that working time may be decreased.

BRIEF DESCRIPTION OF THE DRAWINGS

The above and other features of the inventive concept will become more apparent by describing in detail exemplary embodiments thereof with reference to the accompanying drawings, in which:

FIG. 4 is a perspective view briefly illustrating an exposure apparatus according to an exemplary embodiment of inventive concept;

FIG. 8 is a perspective view briefly illustrating an exposure apparatus according to an exemplary embodiment of inventive concept.

DETAILED DESCRIPTION

Hereinafter, the inventive concept will be explained in detail with reference to the accompanying drawings.

Figure 1:
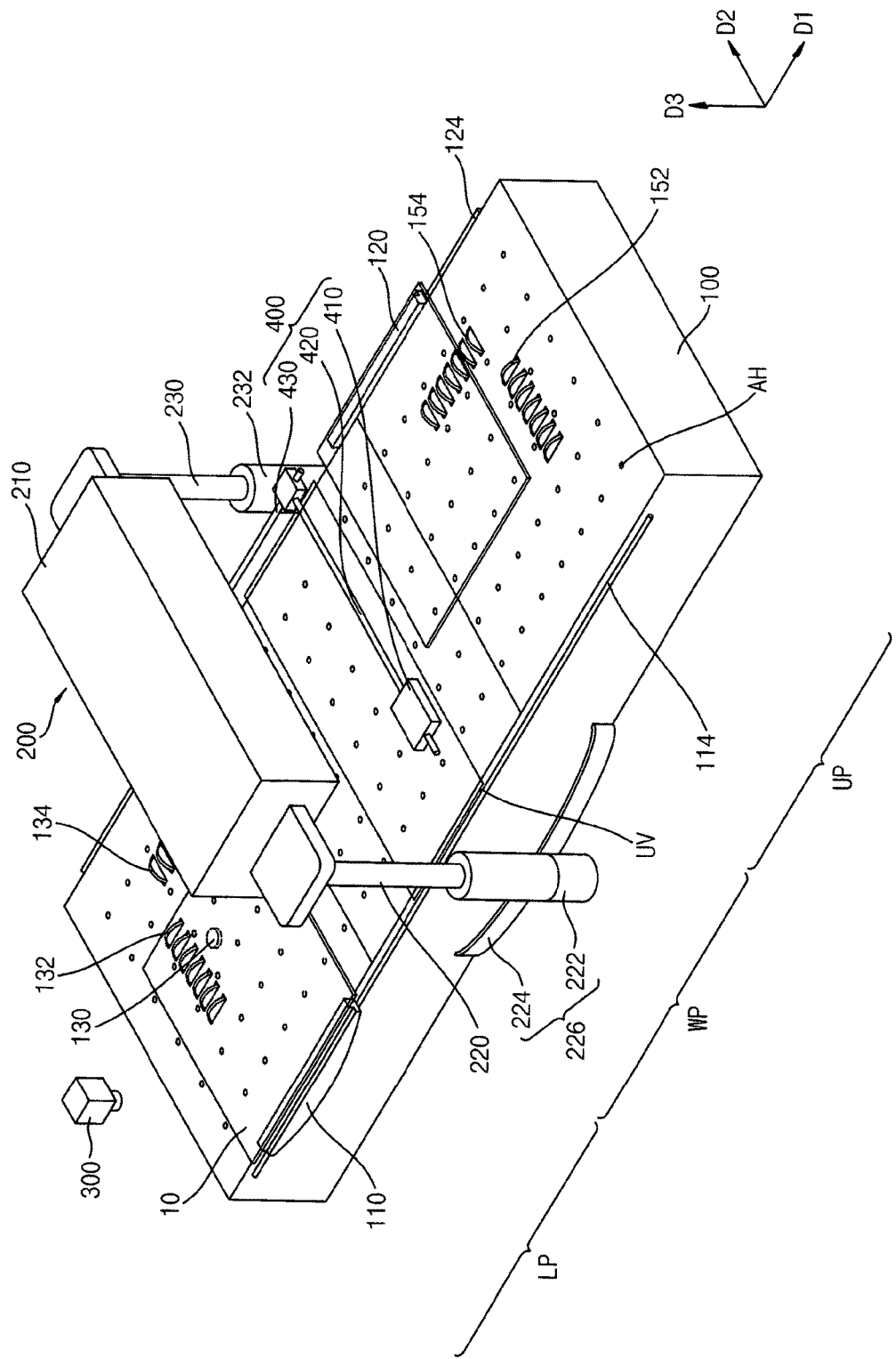
FIG. 1 is a perspective view briefly illustrating an exposure apparatus according to an exemplary embodiment of inventive concept.
Figure 2:
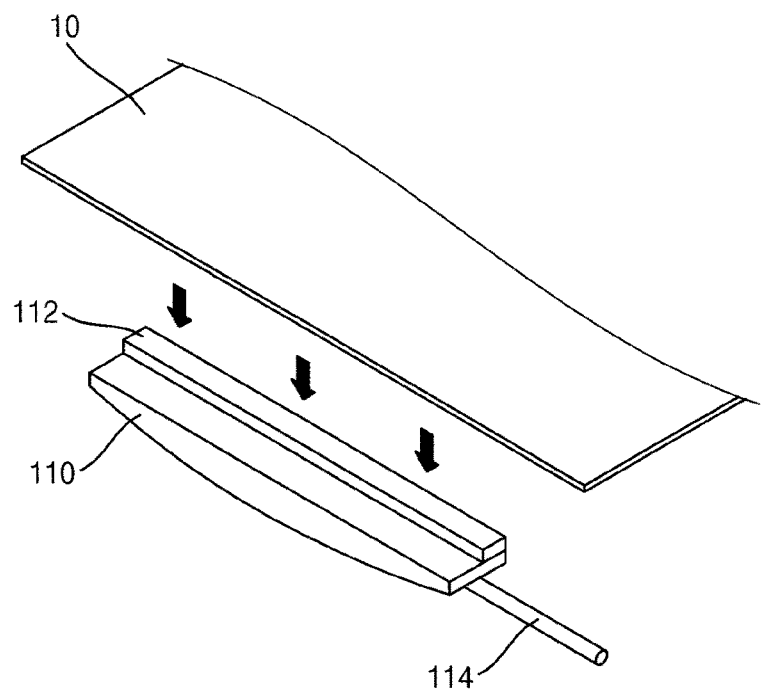
FIG. 2 is a perspective view illustrating a first gripper of FIG. 1.

FIG. 1 is a perspective view briefly illustrating an exposure apparatus according to an exemplary embodiment of inventive concept. FIG. 2 is a perspective view illustrating a first gripper of FIG. 1.

Referring to FIGS. 1 and 2, an exposure apparatus includes a stage 100, an exposure part 200 and a camera 300.

The stage 100 extends in a first direction D1 which is a moving direction of a substrate in the exposure apparatus, and has a width in a second direction D2 which is substantially perpendicular to the first direction D1. The stage 100 includes a loading portion LP, a working portion WP and an unloading portion UP which are disposed in the first direction in order. The stage 100 includes a first gripper 110 and a second gripper 120. The first gripper 110 and a second gripper 120 are disposed adjacent to the loading portion LP, the working portion WP and the unloading portion UP in the second direction D2. The first gripper 110 and a second gripper 120 may move in the first direction D1.

The loading portion LP includes a substrate rotator 130, a first loading roller 132 and a second loading roller 134. The first loading roller 132 has a rotation axis in parallel with the second direction D2. The first loading roller 132 may contact to a substrate 10 and may rotate to move the substrate 10 in the first direction D1. At this time, the camera 300 may recognize a position of the substrate 10. The first loading roller 132 may rotate until the substrate 10 reaches at a proper position in the first direction D1.

The second loading roller 134 has a rotation axis in parallel with the first direction D1. The second loading roller 134 may contact to a substrate 10 and may rotate to move the substrate 10 in the second direction D2. At this time, the camera 300 may recognize a position of the substrate 10. The second loading roller 134 may rotate until the substrate 10 reaches at a proper position in the second direction D2.

The substrate rotator 130 is configured to be attached on the substrate 10 and rotates the substrate 10 in a plan which is in parallel with the first and second directions D1 and D2, so that an angle formed between the substrate 10 and the first direction D1 may be controlled. For example, the substrate 10 may be rotated to adjust a side of the substrate 10 being in parallel with the first direction D1, so that the substrate 10 may pass the working portion WP in a perpendicular direction. The direction of the substrate 10 is only illustrative and is not intended to be limiting in any way. The direction of the substrate 10 may be altered corresponding to the alignment direction.

The first gripper 110 includes a first absorbing part 112 disposed to contact the substrate 10. The first absorbing part 112 may include a porous material. A vacuum is formed on the first absorbing part 112, so that edge of the substrate 10 may be attached on the first absorbing part 112 of the first gripper 110 to fix the substrate 10. The first gripper 110 may be move along the first direction D1 by a first guiding part 114 which extends in the first direction D1. Thus, as the first gripper 110 moves along the first direction D1, the substrate 10 may be transferred to the first direction D1.

The second gripper 120 includes a second absorbing part (not shown)and the second guiding part (not shown)which are substantially the same as the first gripper 110 including the first absorbing part 112 and the first guiding part 114, except that the second gripper 120 including a second absorbing part and the second guiding part are disposed opposite to the first gripper 110 including the first absorbing part 112 and the first guiding part 114 with respect to the loading portion LP, the working portion WP and the unloading portion UP. In the present example embodiment, the first and second grippers 110 and 120 use vacuum to attach the substrate to the gripper, the first and second grippers 110 and 120 may have various types to move the substrate. For example the first and second grippers 110 and 120 may include chucks to grab the substrate, or include an adhesive material to attach the substrate.

The stage may be an air floating stage. A plurality of air holes AH may be formed on surfaces of the loading portion LP, the working portion WP and the unloading portion UP. Air is blown through the air holes AH to form a positive pressure on the surfaces. Thus, the substrate 10 may be transferred without contacting the stage 100 by the air floating stage.

The exposure part 200 is spaced apart from the working portion WP in a third direction D3 which is substantially perpendicular to the first and second directions D1 and D2. The exposure part 200 includes a light source part 210, a first supporting part 220, a second supporting part 230, a tilt part 226 and a hinge part 232.

The light source part 210 is disposed on the working portion WP. The light source part 210 includes an ultra violet light source generating an ultra violet ray, and a wire grid polarizer polarizing the ultra violet ray. The ultra violet ray generated from the light source part 210 hardens the photo alignment agent which is coated on the substrate 10 to form an alignment layer. The ultra violet is irradiated to an exposure area UV of the working portion WP.

The first supporting part 220 is connected to a first side of the light source part 210 in the second direction D2, and connected to the hinge part 232. The second supporting part 230 is connected to a second side of the light source part 210 which is opposite to the first side, and connected to the hinge part 232. The tilt part 226 and the hinge part 232 are fixed to the stage. Each of the first and second supporting parts 220 and 230 includes a piston, so that the light source part 210 may be move in the third direction D3 by the piston.

The light source part 210 may be tilted with respect to the first direction D1 in a plan which is in parallel with the first and second direction D1 and D2. For example, the tilt part 226 include a driving part 222 connected to the first supporting part 220, and a guide rail 224 having a circular arc shape and fixed on the stage. The driving part 222 move on the guide rail 224, so that the light source part 210 may have a tilt angle with respect to the first direction D1. Detailed explanation about this will be mentioned in FIGS. 3A to 3C.

The unloading portion UP includes a first unloading roller 152 and a second unloading roller 154. The second unloading roller 154 has a rotation axis in parallel with the first direction D1. The second unloading roller 154 may contact to a substrate 10 and may rotate to move the substrate 10 in the second direction D2. The first unloading roller 152 has a rotation axis in parallel with the second direction D2. The first unloading roller 152 may contact to a substrate 10 and may rotate to move the substrate 10 in the first direction D1.

As the vacuum is removed, the substrate 10 on the unloading portion UP is separated from the first or second gripper 110, 120. And then, the substrate 10 moved in the second direction D2 by the second unloading roller 154 until the substrate 10 reaches a center of the unloading portion UP in the second direction D2. And then, the substrate 10 is moved in the first direction and unloaded by the first unloading roller 152.

Thus, the substrate 10 which is a work piece is loaded on the loading portion LP. The substrate 10 is transferred to the working portion WP by the first or second gripper 110, 120. The ultra violet ray is irradiated on the substrate 10. The substrate 10 is transferred to the unloading portion UP by the first or second gripper 110, 120. The substrate 10 is unloaded from the unloading portion UP.

The exposure apparatus may further include a polarization measuring part 400.

The polarization measuring part 400 may measure amount of the ultra violet ray and polarization direction from the exposure part 200. Thus, polarization measuring part 400 may test a quality of the ultra violet ray from the exposure part 200. For example, the polarization measuring part 400 may include a measuring portion 410, a first axis 430 and a second axis 420. The measuring portion 410 is connected to the first axis 430 extends in the first direction D1, and the second axis 420 extends in the second direction D2. The measuring portion 410 may move along the first and second axis 420 and 430, so that the measuring portion 410 may scan the exposure area UV. The light source part 210 of the exposure part 200 moves upward by the first and second supporting part 220 and 230, so that a space for the measuring portion 410 may be freely moved on the exposure area. After measuring the amount of the ultra violet ray and polarization direction, the measuring portion 410 moves out of the exposure area UV, the light source part 210 moves down to an original position.

The exposure apparatus may further include a cooler (not shown) disposed under the working portion WP. For example, a coolant pipe having zigzag pattern may be disposed under the working portion WP to decrease temperature of the exposure area UV.

Figure 3A:
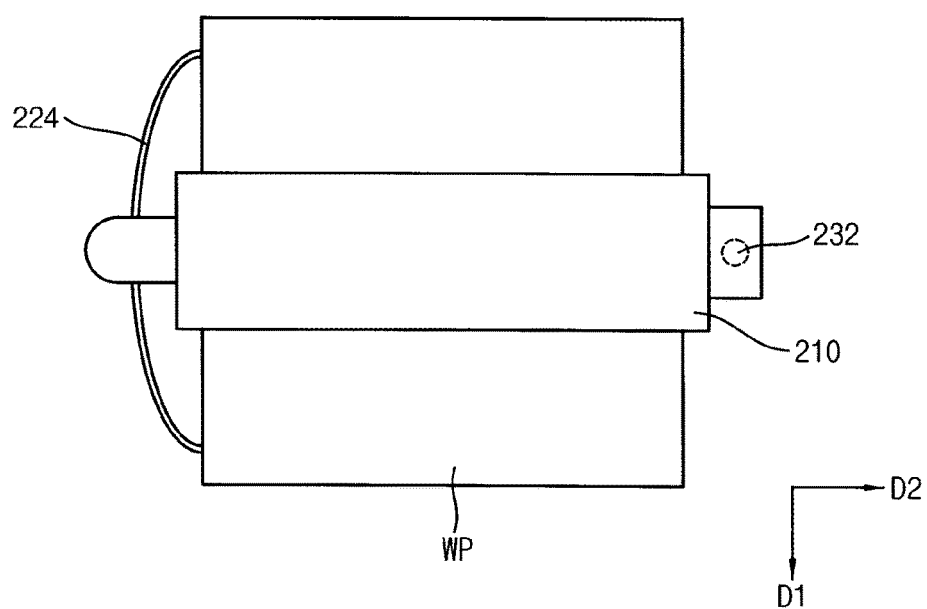
FIGS. 3A to 3C are plan view to explain tilt of a light source part of FIG. 1.
Figure 3B:
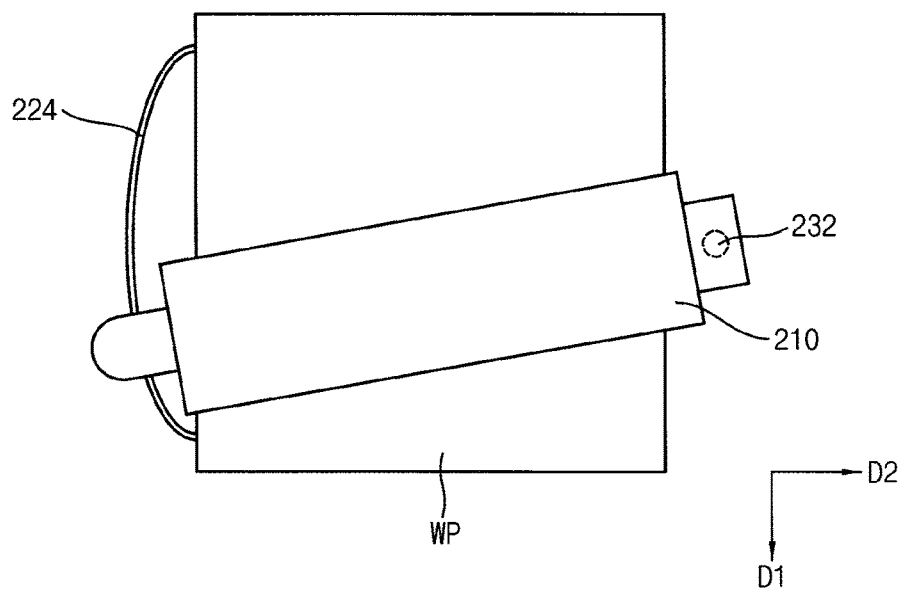
Figure 3C:
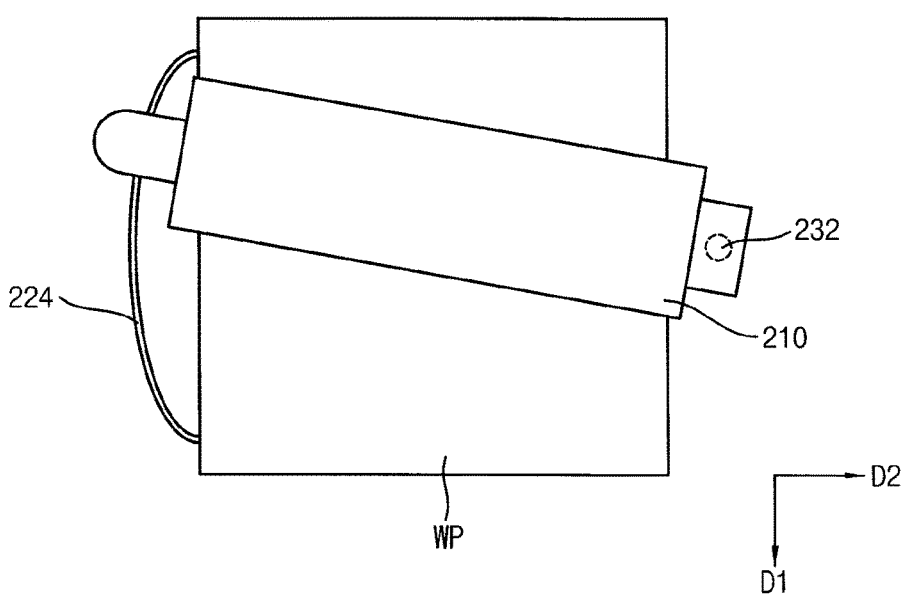

FIGS. 3A to 3c are plan view to explain tilt of a light source part of FIG. 1.

Referring to FIG. 3A, a working portion WP is disposed on a plan in parallel with a first direction D1 and a second direction D2 substantially perpendicular to the first direction D1. A light source part 210 of an exposure part 200 is disposed on the working portion WP.

The light source part 210 extends in the second direction D2. A substrate 10 is inserted to the working portion WP in the first direction D1. A side of the substrate 10 is in parallel with the first direction D1, and a width direction of the substrate 10 is in parallel with the second direction D2. The light source part 210 is disposed in parallel with the second direction D2, and an exposure area UV on which an ultra violet ray formed from the light source part 210 is disposed in parallel with the width direction of the substrate 10.

Referring to FIGS. 1, 3B and 3C, the light source part 210 may be tilted with respect to the first direction D1 in a plan which is in parallel with the first and second direction D1 and D2.

As the driving part 222 moves on a guide rail 224, the light source part 210 may be tilted by a predetermined angle from the first direction D1. The substrate 10 is transferred to the working portion WP in the first direction D1, and the side of the substrate 10 is in parallel with the first direction D1, so that the exposure area UV may maintain a predetermined angle with respect to the width direction of the substrate 10.

FIG. 4 is a perspective view briefly illustrating an exposure apparatus according to an exemplary embodiment of inventive concept.

Referring to FIG. 4, an exposure apparatus is substantially same as an exposure apparatus of FIG. 1, expect for a third gripper 140 and a third guiding part 142. Thus, any further detailed descriptions concerning the same elements will be briefly described or be omitted.

The exposure apparatus includes a stage 100, an exposure part 200 and a camera 300. The stage 100 includes a loading portion LP, a working portion WP and an unloading portion UP which are disposed in the first direction in order. The stage 100 includes a first gripper 110 and a second gripper 120. In addition, the stage 100 may further include a third gripper 140.

The loading portion LP includes a substrate rotator 130, a first loading roller 132 and a second loading roller 134. The exposure part 200 includes a light source part 210, a first supporting part 220, a second supporting part 230, a tilt part and a hinge part 232. The tilt part includes a driving part 222 and a guide rail 224. The unloading portion UP includes a first unloading roller 152 and a second unloading roller 154.

The third gripper 140 may include a third absorbing part contacting with the substrate 10 and including porous material. A vacuum is formed on the third absorbing part, so that center of the substrate 10 may be attached on the third absorbing part to fix the substrate 10.

The third guiding part 142 extends in the first direction D1 and disposed on the loading portion LP, the working portion WP and the unloading portion UP. The third guiding part 142 is disposed between the first guiding part 114 and the second guising part 124. The third gripper 140 may move in the first direction D1 by the third guiding part 142. As the third gripper 140 moves in the first direction D1, the substrate 10 may be transferred.

FIGS. 5A to 5O are plan views to explain an operation of the exposure apparatus of FIG. 1 and an exposure method using the exposure apparatus. In the FIGS. 5A to 5O, continuous transfer of substrates with time order will be described.

Referring to FIG. 5A, an exposure apparatus includes a first gripper 110, a second gripper 120, and a loading portion LP, a working portion WP and an unloading portion UP which are disposed in the first direction in order. A plurality of air holes AH is formed on the loading portion LP, the working portion WP and the unloading portion UP. Air cushion is formed by blowing air though the air hole AH. Thus, the substrate may be transferred to a first direction D1 and a second direction D2 with air cushioned. The loading portion LP includes a substrate rotator 130, a first loading roller 132 and a second loading roller 134. An exposure area UV on which an ultra violet ray is irradiated is formed on the working portion WP. The unloading portion UP includes a first unloading roller 152 and a second unloading roller 154.

A first substrate 10 is loaded on the loading portion LP in the first direction D1. (refers to an arrow in figures) The first loading roller 132 rotates to move the first substrate 10 to a position corresponding to the first gripper 110 in the first direction D1.

Figure 5B:
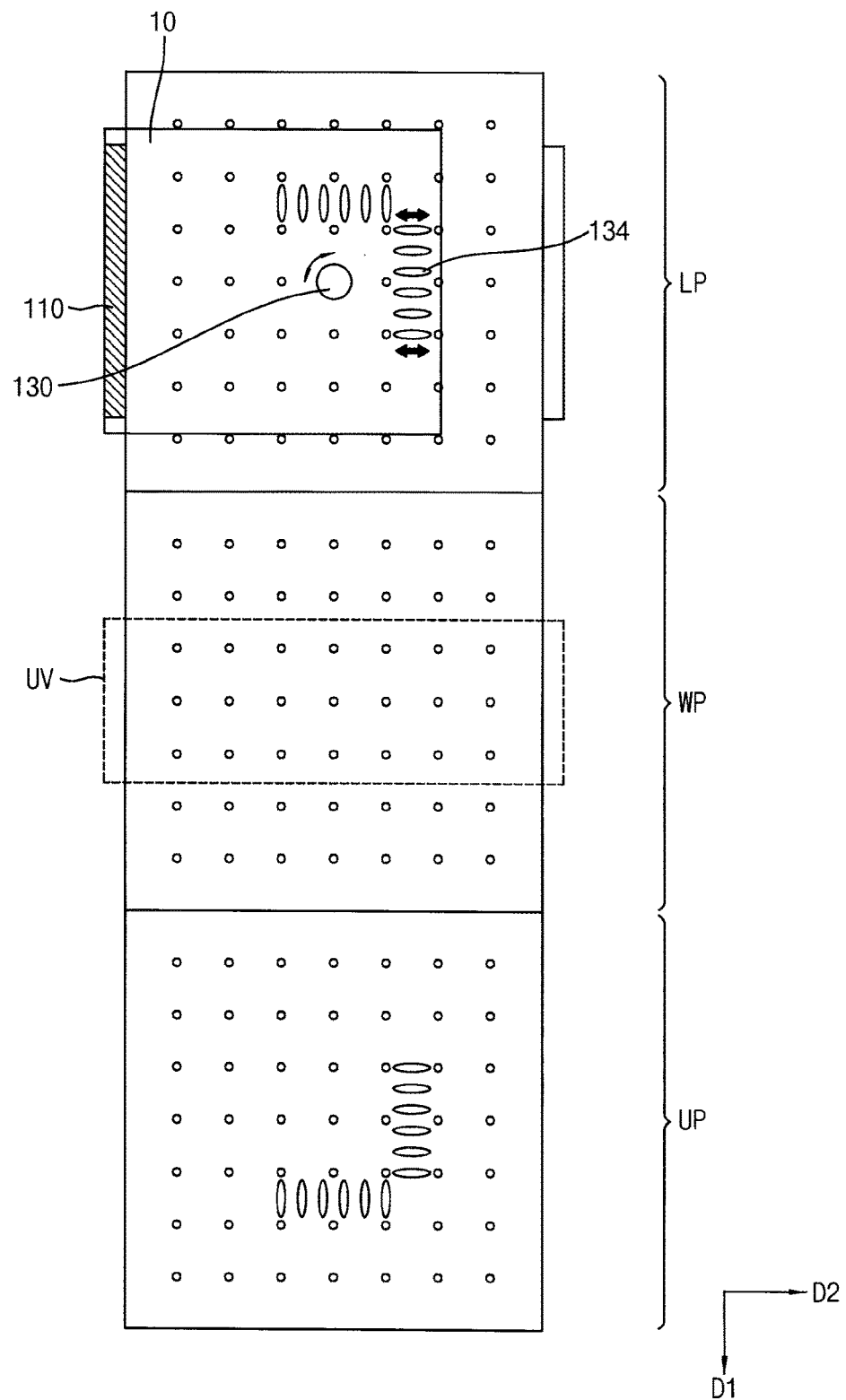
FIGS. 5A to 5O are plan views to explain an operation of the exposure apparatus of FIG. 1 and an exposure method using the exposure apparatus.

Referring to FIG. 5B, the second loading roller 134 rotates to move the first substrate 10 in the second direction D2 to place edge of the first substrate 10 on the first gripper 110. The substrate rotator 130 may is configured to be attached on the first substrate 10, and then the substrate rotator 130 rotates, so that the edge of the first substrate 10 may be disposed in parallel with the first direction D1. At this time, a first substrate 10 is pictured by a camera (refers to 300 of FIG. 3), and the first and second loading roller 132 and 134 and the substrate rotator 130 are operated to align the first substrate 10 in a predetermined direction. As needed, the substrate rotator 130 may rotate the first substrate 10, so that the first substrate 10 have a proper tilt angle with respect to the first direction D1.

After alignment of the first substrate 10, the first gripper 110 may be attached on the first substrate 10 to fix the first substrate 10.

Figure 5C:
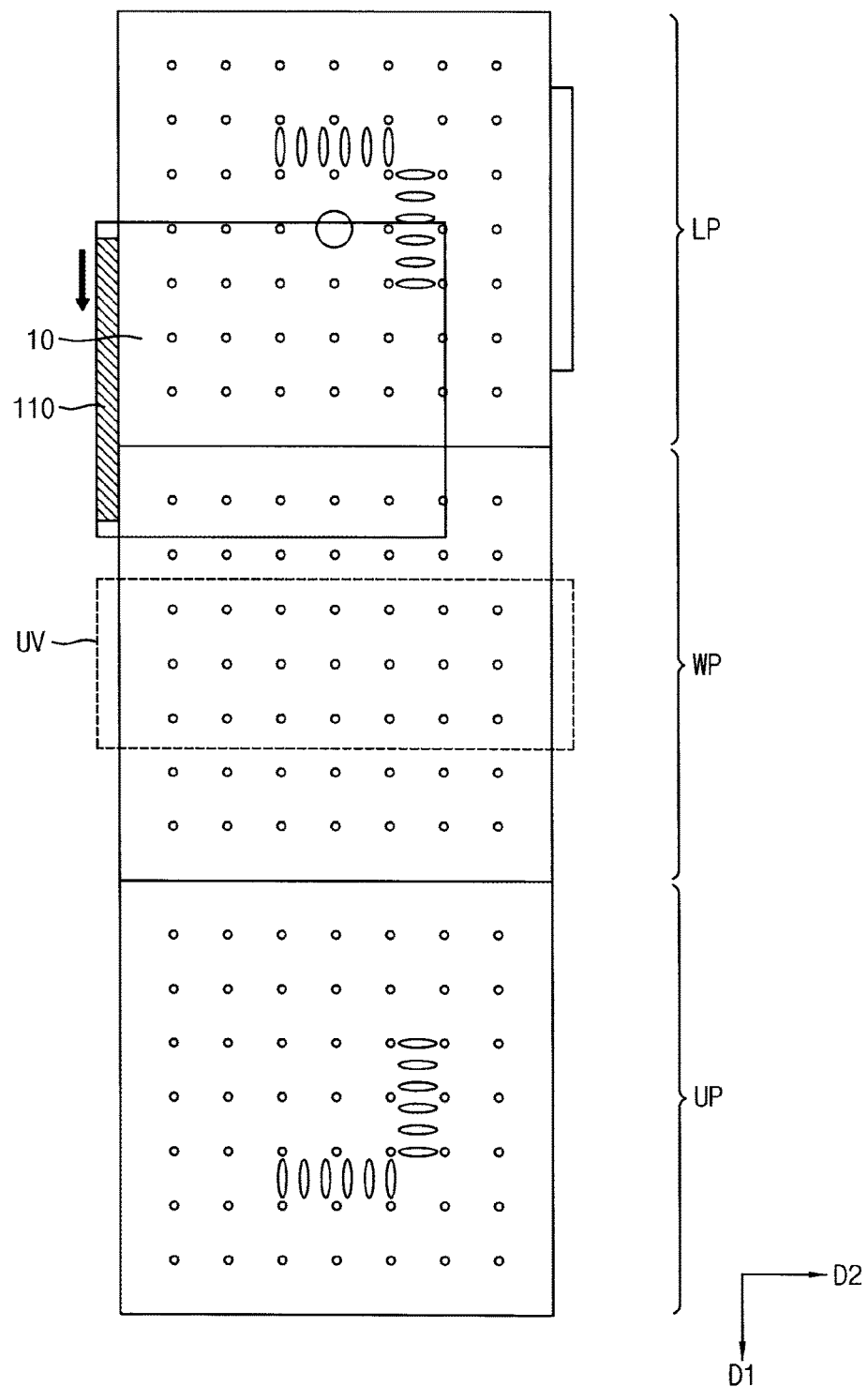

Referring to FIG. 5C, the first gripper 110 moves in the first direction D1 to transfer the first substrate 10 just in front of the exposure area UV. At this time, movement of the first gripper 110 may be faster than movement of the first gripper 110 in the exposure area UV. (refers to an arrow in the figure)

Figure 5D:
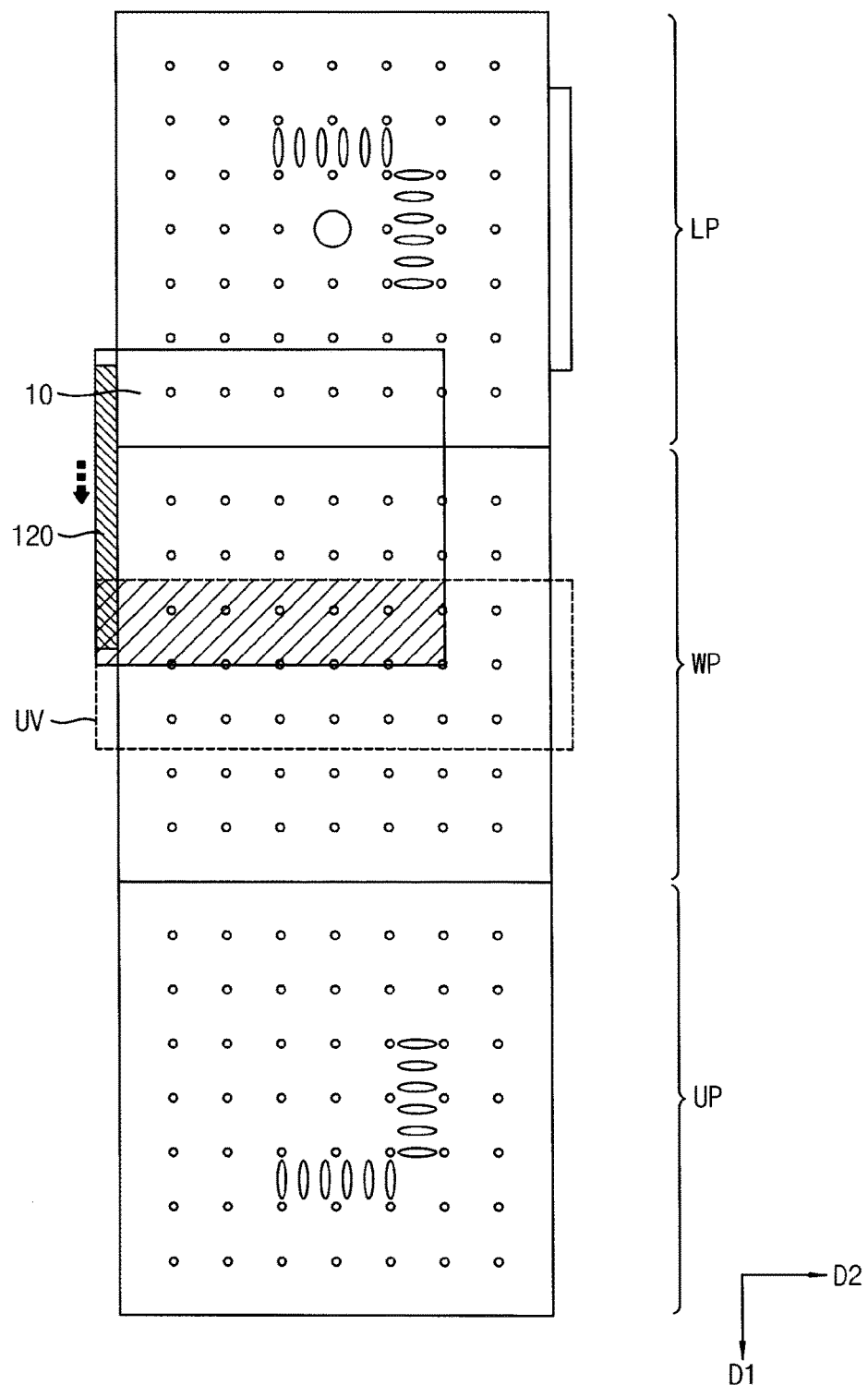

Referring to FIG. 5D, movement of the first gripper 110 in the exposure area UV may be slower than movement of the first gripper 110 out of the exposure area UV in the first direction D1. Thus, the first substrate 10 may be irradiated by an ultra violet ray in the exposure area UV. (refers to a dotted arrow in the figure)

Figure 5E:
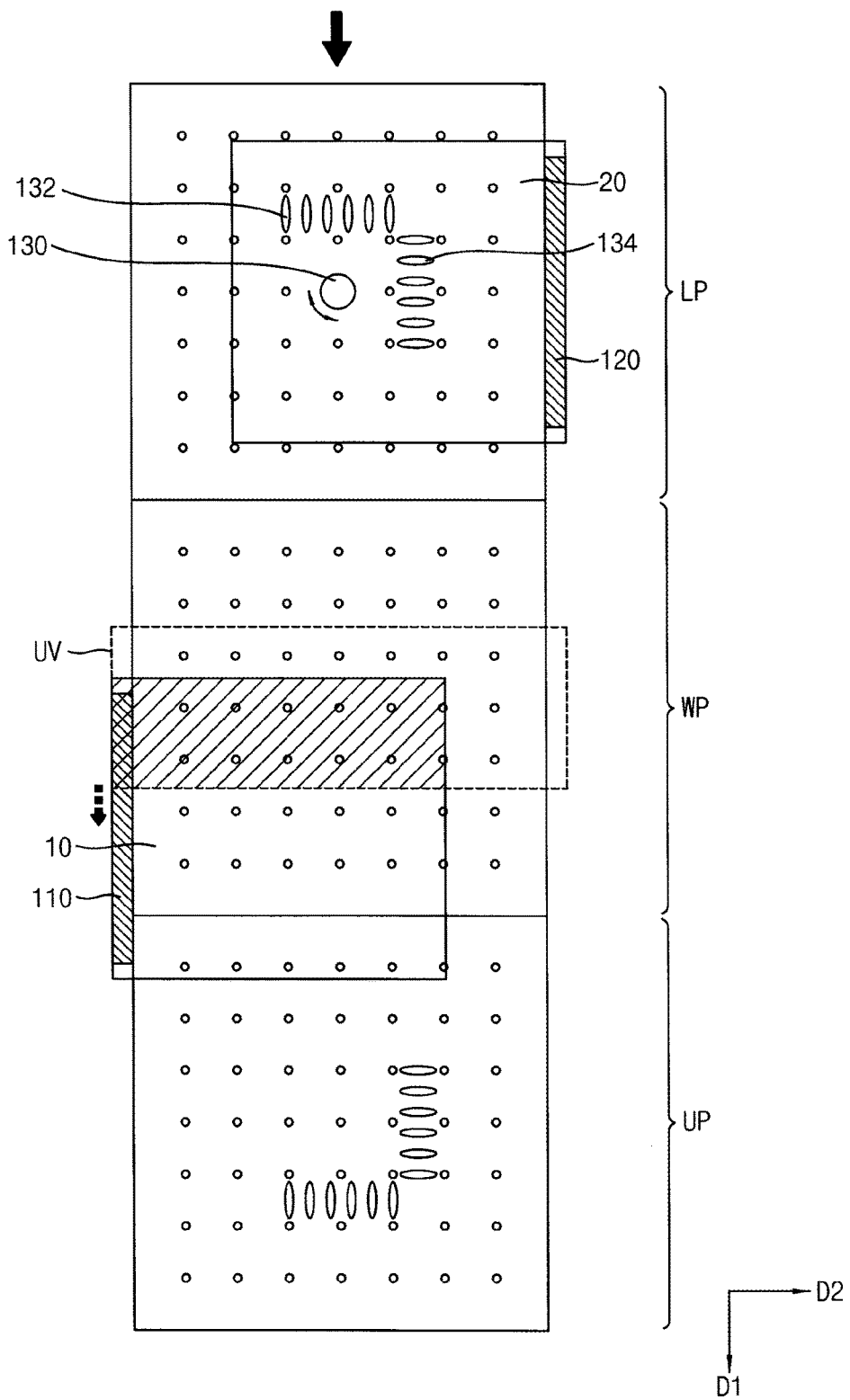

Referring to FIG. 5E, the first gripper 110 may relatively slowly move in the first direction D1. Thus, the first substrate 10 may be irradiated by the ultra violet ray in the exposure area UV. (refers to a dotted arrow in the figure)

Just after the first substrate 10 passes out of the loading portion LP, a second substrate 20 is loaded on the loading portion LP. The second substrate 20 is attached on the second gripper positioned on the opposite side of the loading portion LP.

For example, the second substrate 20 is loaded on the loading portion LP in the first direction D1. (refers to an arrow in the figure) The first loading roller 132 rotates to move the substrate 10 to a position corresponding to the second gripper 120 in the first direction D1. The second loading roller 134 rotates to move the second substrate 20 in the second direction D2 to place edge of the second substrate 20 on the second gripper 120. The substrate rotator 130 may be attached on the second substrate 20, and then the substrate rotator 130 rotates, so that the edge of the second substrate 20 may be disposed in parallel with the first direction D1. At this time, the second substrate 20 is pictured by the camera, and the first and second loading roller 132 and 134 and the substrate rotator 130 are operated to align the second substrate 20 in a predetermined direction. As needed, the substrate rotator 130 may rotate the second substrate 20, so that the second substrate 20 have a proper tilt angle with respect to the first direction D1. After alignment of the second substrate 20, the second gripper 120 may be attached on the second substrate 20 to fix the second substrate 20.

Figure 5F:
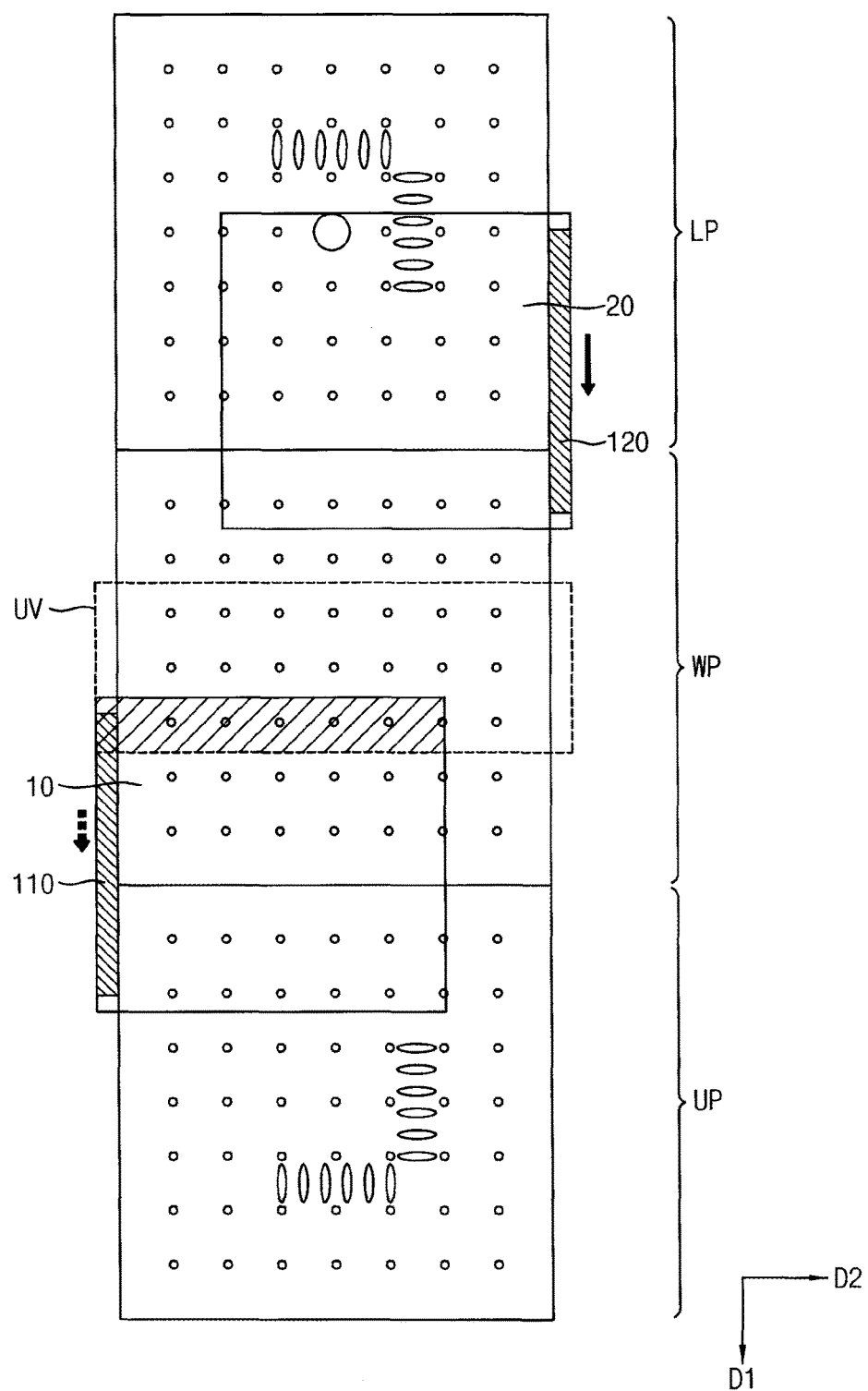

Referring to FIG. 5F, the first gripper 110 may relatively slowly move in the first direction D1. Thus, the first substrate 10 may be irradiated by the ultra violet ray in the exposure area UV. (refers to a dotted arrow in the figure)

At the same time, the second gripper 120 moves in the first direction D1 to transfer the second substrate 20 just in front of the exposure area UV. At this time, movement of the second gripper 120 may be faster than movement of the second gripper 120 in the exposure area UV. (refers to an arrow in the figure)

Figure 5G:
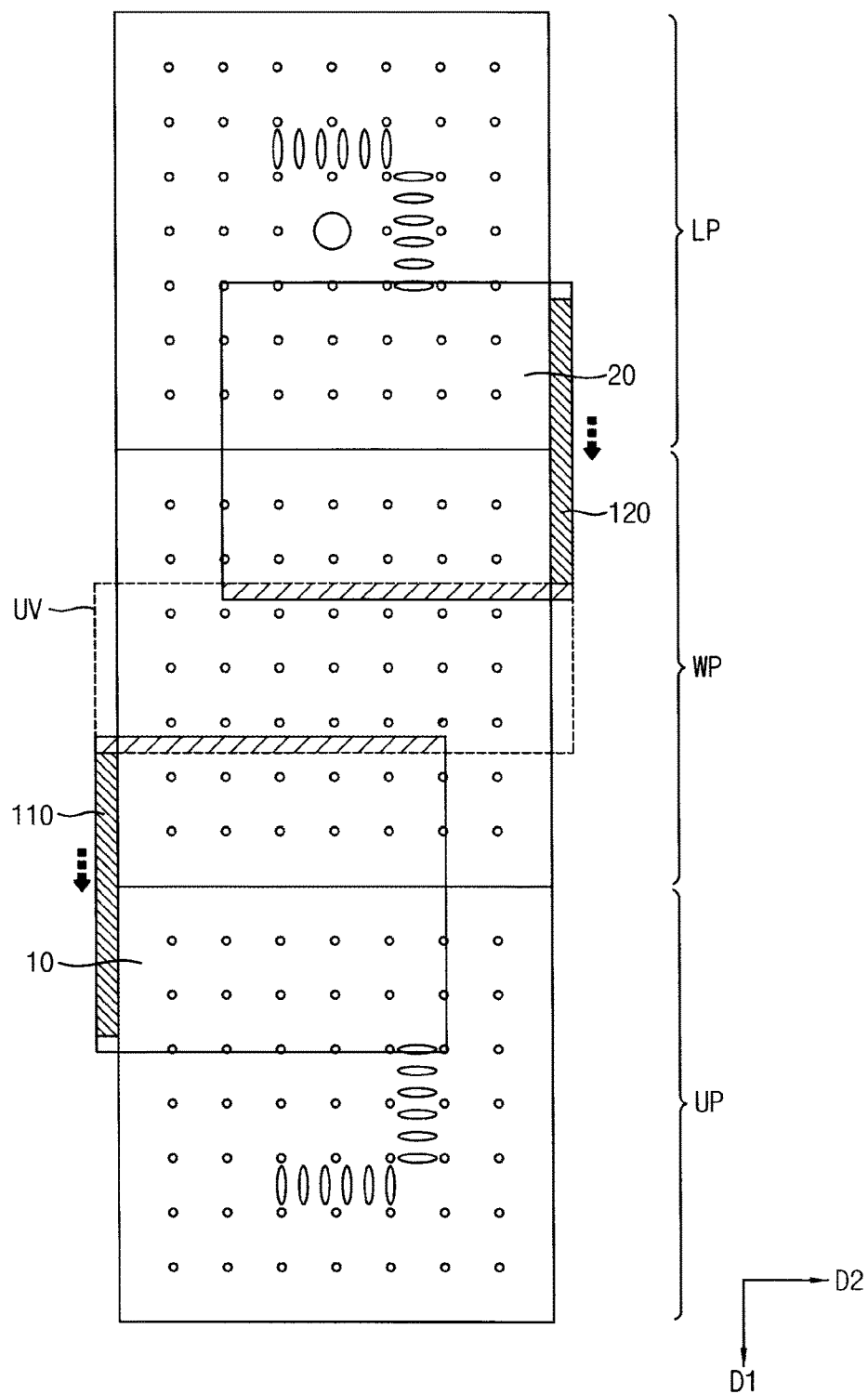

Referring to FIG. 5G, the first gripper 110 may relatively slowly move in the first direction D1. Thus, the first substrate 10 may be irradiated by the ultra violet ray in the exposure area UV. (refers to a dotted arrow in the figure)

At the same time, the second gripper 120 may relatively slowly move in the first direction D1 comparing to movement of second gripper 120 out of the exposure area UV. Thus, the second substrate 20 may be irradiated by the ultra violet ray in the exposure area UV. (refers to a dotted arrow in the figure)

Thus, the first substrate 10 and the second substrate 20 may be irradiated in the exposure area UV, simultaneously.

Figure 5H:
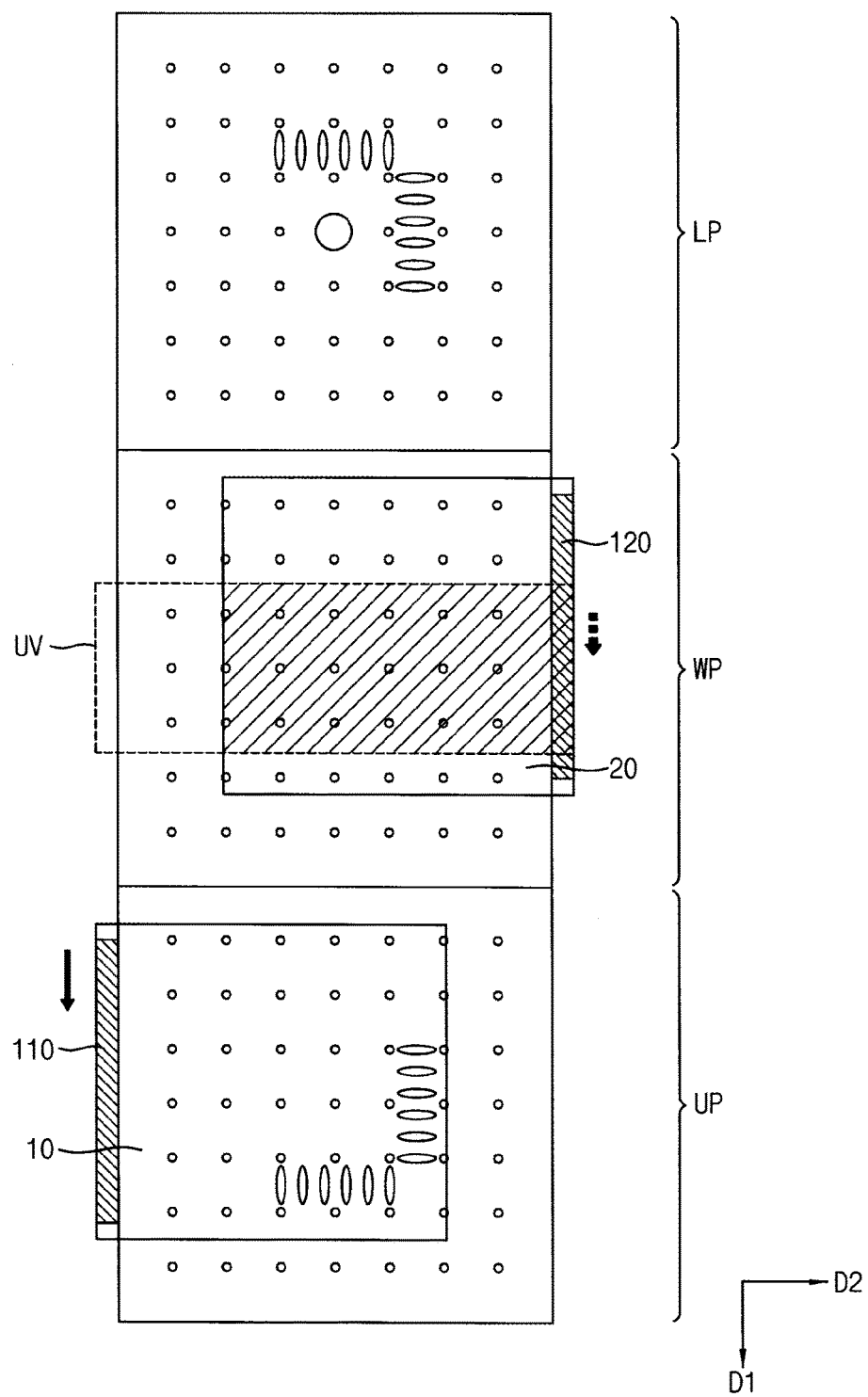
Figure 51:
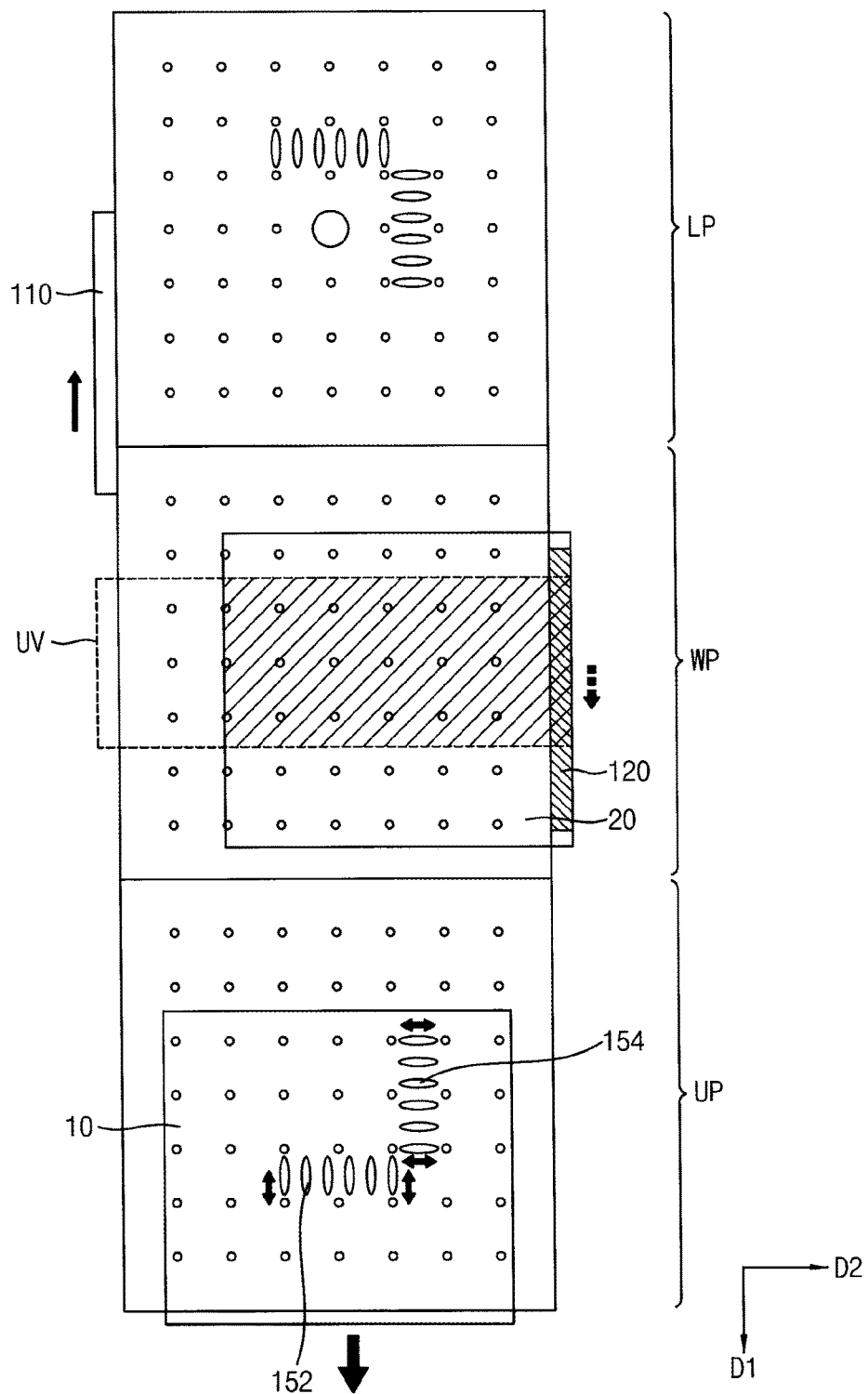

Referring to FIG. 5H, the first gripper 110 moves in the first direction D1, so that the first substrate 10 is transferred to the unloading portion UP. At this time, the first gripper 110 may relatively quickly move comparing to movement of the first gripper 110 in the exposure area UV. (refers to an arrow in the figure)

At the same time, the second gripper 120 may relatively slowly move in the first direction D1. Thus, the second substrate 20 may be irradiated by the ultra violet ray in the exposure area UV. (refers to a dotted arrow in the figure)

Referring to FIG. 5I, the first substrate 10 may be separated from the first gripper 110. The second unloading roller 154 rotates to move the first substrate 10 until the first substrate 10 reaches a center of the unloading portion UP in the second direction D2. The first unloading roller 152 rotates to move the first substrate 10 in the first direction D1, so that the first substrate 10 may be unloaded from the unloading portion UP. (refers to an arrow in the figure)

At the same time, the first gripper 110 moves opposite direction to the first direction D1, and returned to the loading portion LP. (refers to an arrow in the figure)

At the same time, the second gripper 120 may relatively slowly move in the first direction D1. Thus, the second substrate 20 may be irradiated by the ultra violet ray in the exposure area UV. (refers to a dotted arrow in the figure)

Figure 5J:
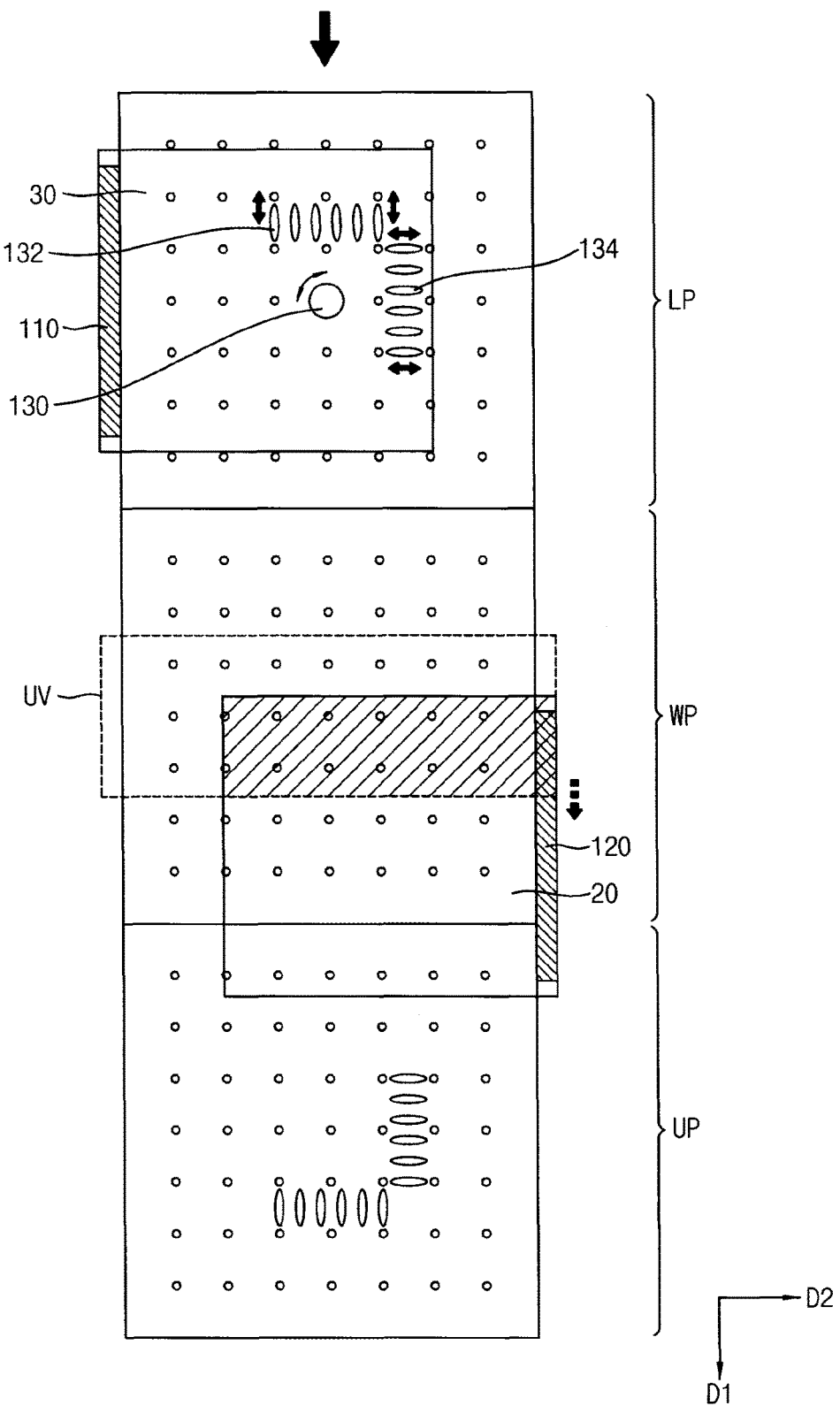

Referring to FIG. 5J, the second gripper 120 may relatively slowly move in the first direction D1. Thus, the second substrate 20 may be irradiated by the ultra violet ray in the exposure area UV. (refers to a dotted arrow in the figure)

At the same time, a third substrate 30 is loaded on the loading portion LP, and attached on the first gripper 110.

For example, the third substrate 30 may be loaded on the loading portion LP in the first direction D1. (refers to an arrow in the figure) The first loading roller 132 rotates to move the third substrate 30 to a position corresponding to the first gripper 110 in the first direction D1. The second loading roller 134 rotates to move the third substrate 30 in the second direction D2 to place edge of the third substrate 30 on the first gripper 110. The substrate rotator 130 may be attached on the third substrate 30, and then the substrate rotator 130 rotates, so that the edge of the third substrate 30 may be disposed in parallel with the first direction D1. At this time, the third substrate 30 is pictured by the camera, and the first and second loading roller 132 and 134 and the substrate rotator 130 are operated to align the third substrate 30 in a predetermined direction. As needed, the substrate rotator 130 may rotate the third substrate 30, so that the third substrate 30 have a proper tilt angle with respect to the first direction D1. After alignment of the third substrate 30, the first gripper 110 may be attached on the third substrate 30 to fix the third substrate 30.

Figure 5K:
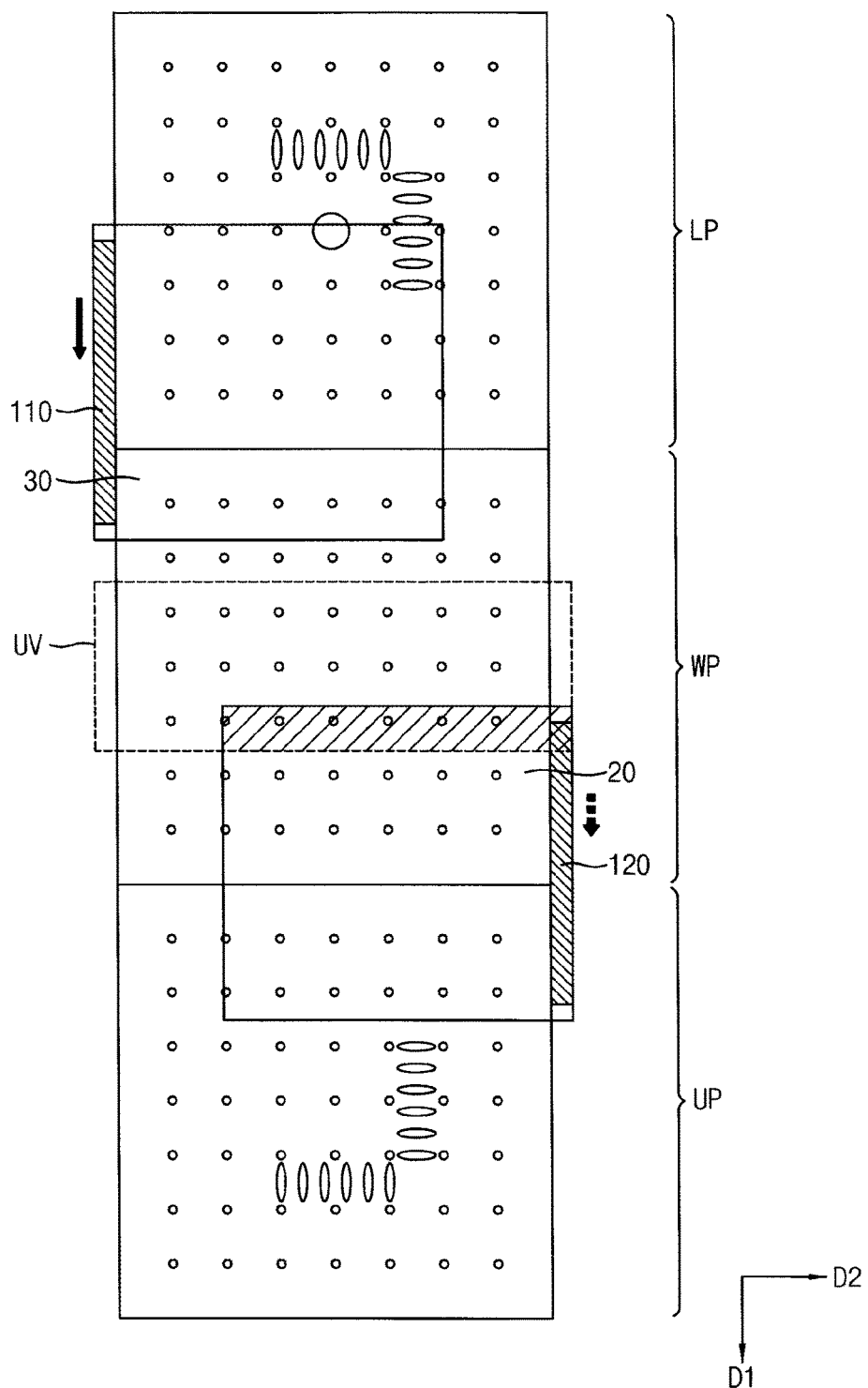

Referring to FIG. 5K, the second gripper 120 may relatively slowly move in the first direction D1. Thus, the second substrate 20 may be irradiated by the ultra violet ray in the exposure area UV. (refers to a dotted arrow in the figure)

At the same time, the first gripper 110 moves in the first direction D1 to transfer the third substrate 30 just in front of the exposure area UV. At this time, movement of the first gripper 110 may move faster than the movement of the first gripper 110 in the exposure area UV. (refers to an arrow in the figure)

Figure 5L:
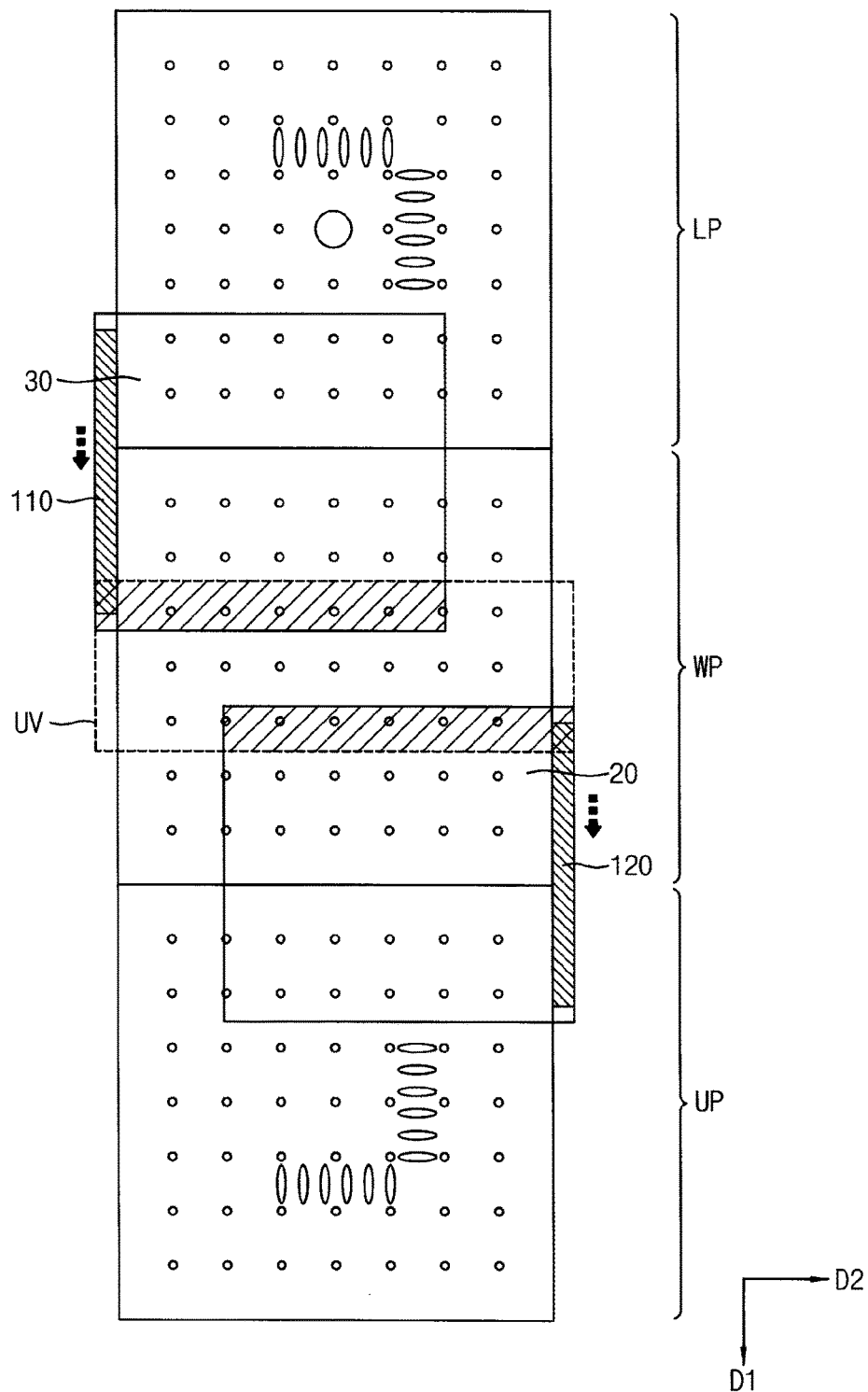

Referring to FIG. 5L, the second gripper 120 may move relatively slowly in the first direction D1. Thus, the second substrate 20 may be irradiated by the ultra violet ray in the exposure area UV. (refers to a dotted arrow in the figure)

At the same time, the first gripper 110 may relatively slowly move in the first direction D1. Thus, the third substrate 30 may be irradiated by the ultra violet ray in the exposure area UV. (refers to a dotted arrow in the figure)

Thus, the second substrate 20 and the third substrate 30 may be irradiated in the exposure area UV, simultaneously.

Figure 5M:
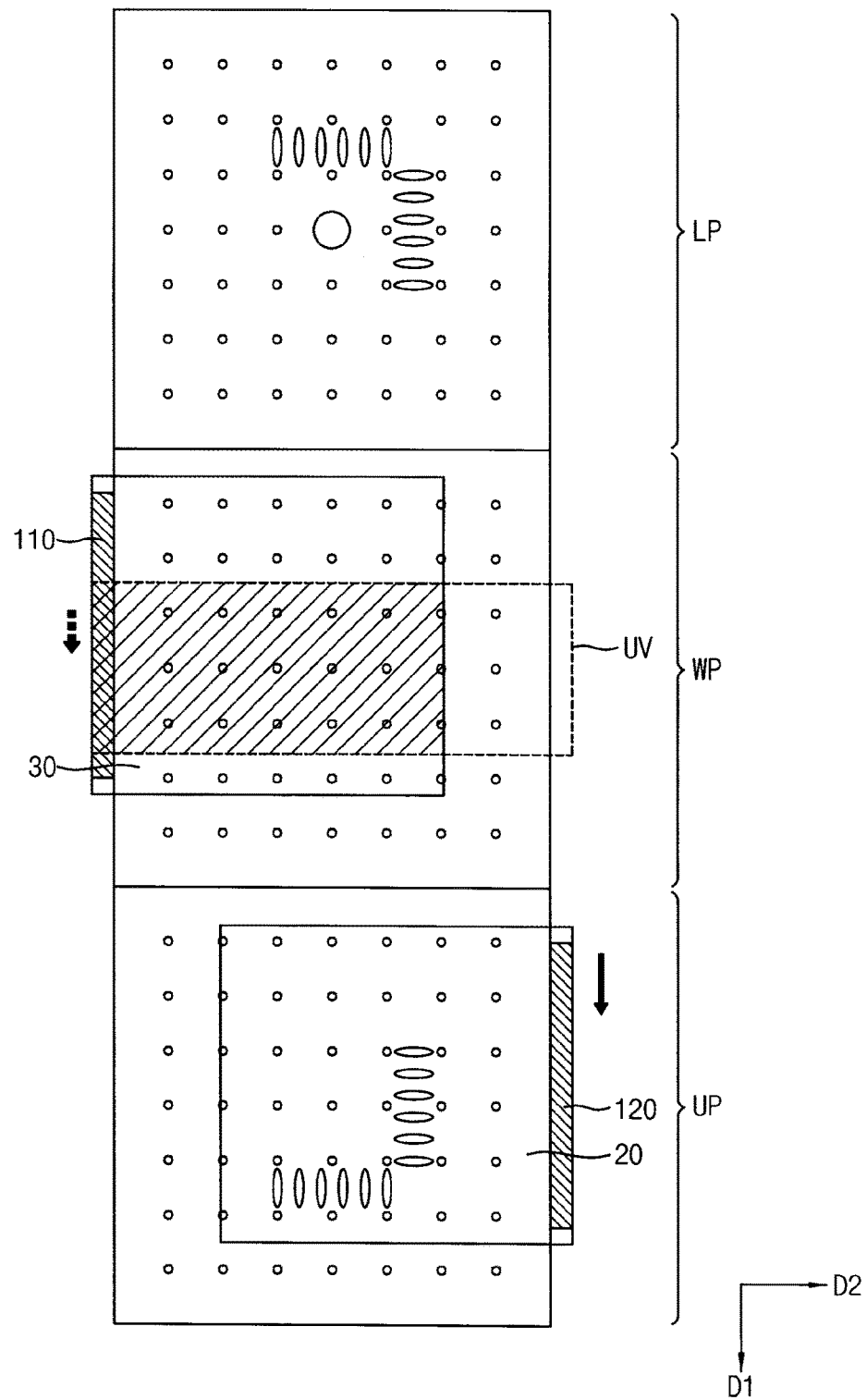

Referring to FIG. 5M, the second gripper 120 moves in the first direction D1, so that the second substrate 20 is transferred to the unloading portion UP. At this time, the second gripper 120 may relatively quickly move comparing to movement of the second gripper 120 in the exposure area UV. (refers to an arrow in the figure)

At the same time, the first gripper 110 may move relatively slowly in the first direction D1. Thus, the third substrate 30 may be irradiated by the ultra violet ray in the exposure area UV. (refers to a dotted arrow in the figure)

Figure 5N:
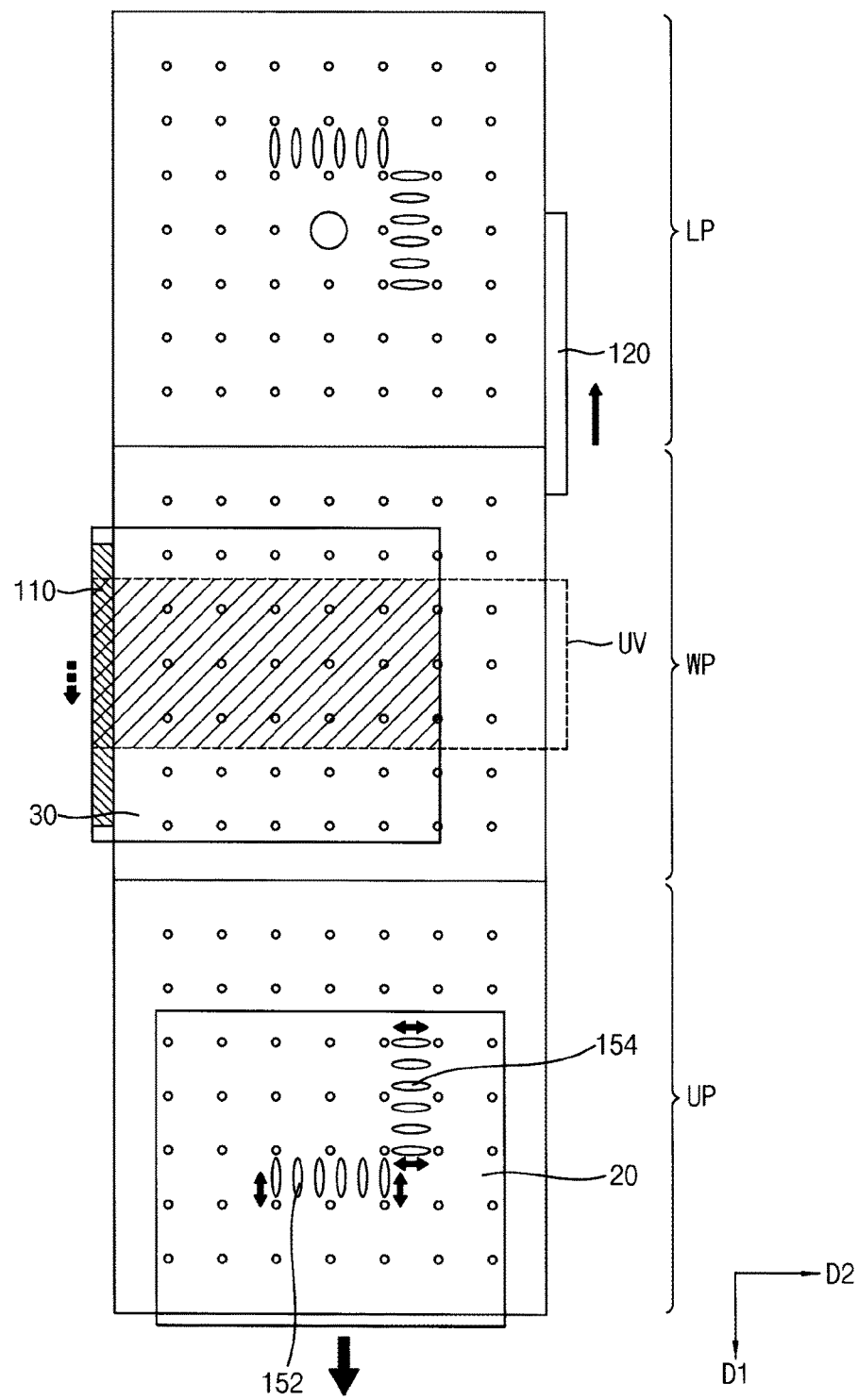
Figure 50:
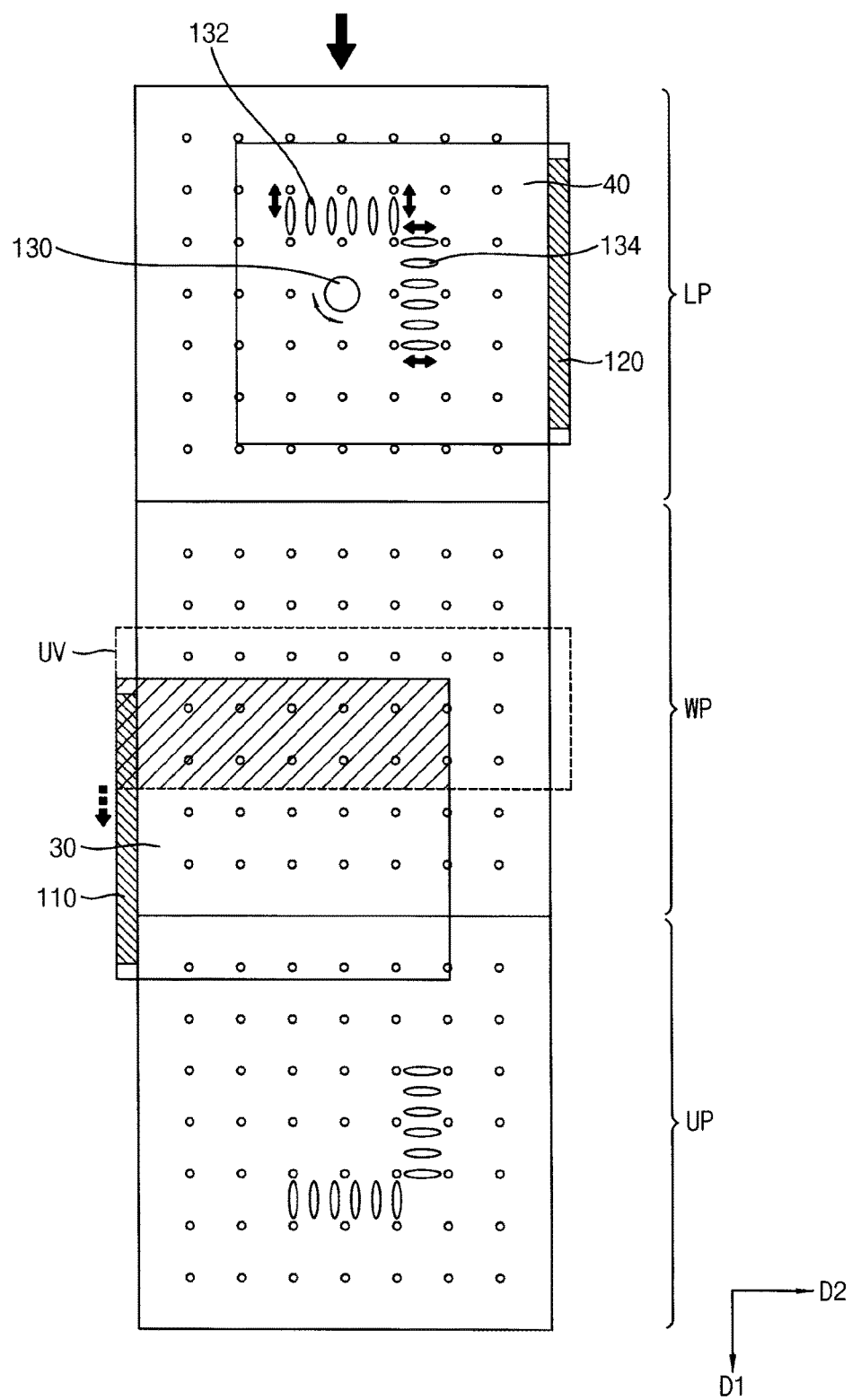

Referring to FIG. 5N, the second substrate 20 may be separated from the second gripper 120. After that, the second unloading roller 154 rotates to move the second substrate 20 until the second substrate 20 reaches a center of the unloading portion UP in the second direction D2. After that, the first unloading roller 152 rotates to move the second substrate 20 in the first direction D1, so that the second substrate 20 may be unloaded from the unloading portion UP. (refers to an arrow in the figure)

At the same time, the second gripper 120 moves opposite direction of the first direction D1, and returned to the loading portion LP. (refers to an arrow in the figure)

At the same time, the first gripper 110 may move relatively slowly in the first direction D1. Thus, the third substrate 30 may be irradiated by the ultra violet ray in the exposure area UV. (refers to a dotted arrow in the figure)

Referring to FIG. 5O, the first gripper 110 may relatively slowly move in the first direction D1. Thus, the third substrate 30 may be irradiated by the ultra violet ray in the exposure area UV. (refers to a dotted arrow in the figure)

At the same time, a fourth substrate 40 is loaded on the loading portion LP, and attached on the second gripper 120.

For example, the fourth substrate 40 may be loaded on the loading portion LP in the first direction D1. (refers to an arrow in the figure) The first loading roller 132 rotates to move the fourth substrate 40 to a position corresponding to the second gripper 120 in the first direction D1. The second loading roller 134 rotates to move the fourth substrate 40 in the second direction D2 to place edge of the fourth substrate 40 on the second gripper 120. The substrate rotator 130 may be attached on the fourth substrate 40, and then the substrate rotator 130 rotates, so that the edge of the third substrate 30 may be disposed in parallel with the first direction D1. At this time, the fourth substrate 40 is pictured by the camera, and the first and second loading roller 132 and 134 and the substrate rotator 130 are operated to align the fourth substrate 40 in a predetermined direction. As needed, the substrate rotator 130 may rotate the fourth substrate 40, so that the fourth substrate 40 have a proper tilt angle with respect to the first direction D1. After alignment of the fourth substrate 40, the second gripper 120 may be attached on the fourth substrate 40 to fix the fourth substrate 40.

Repeating the process of FIGS. 5A to 5O, a plurality of substrates may be transferred in the first direction D1 in order during an exposure process. The exposure method includes a step that two substrates are simultaneously irradiated, so that working time may be decreased.

Referring again to FIGS. 5A and 5O, the exposure method using the exposure apparatus includes loading a first substrate, moving the first substrate relatively quickly in a first speed in a loading portion LP in which the substrate is not irradiated by the ultra violet ray, irradiating the first substrate in the working portion WP while moving the substrate in a second speed relatively slower than the first speed, irradiating the first substrate by the ultra violet ray in the working portion WP while loading a second substrate in a loading portion LP, irradiating the first substrate while moving the second substrate in a first speed in the loading portion LP, irradiating the first substrate and the second substrate simultaneously in the working portion WP, moving the first substrate in the first speed in the unloading portion UP during irradiating the second substrate in the working portion WP while moving the second substrate in a second speed, unloading the first substrate during irradiating the second substrate in the working portion WP, and irradiating the second substrate in the working portion while loading a third substrate in the loading portion LP.

Loading the first substrate may include aligning the first substrate. Loading the second substrate may include aligning the second substrate. Loading the third substrate may include aligning the third substrate.

The exposure method implements a simultaneous irradiation of two substrates and increases moving speed when the substrates are not irradiated by the UV light, so that alignment time of the substrate may be decreased. Thus, throughput of the apparatus for the photo-alignment process may be enhanced.

Figure 6B:
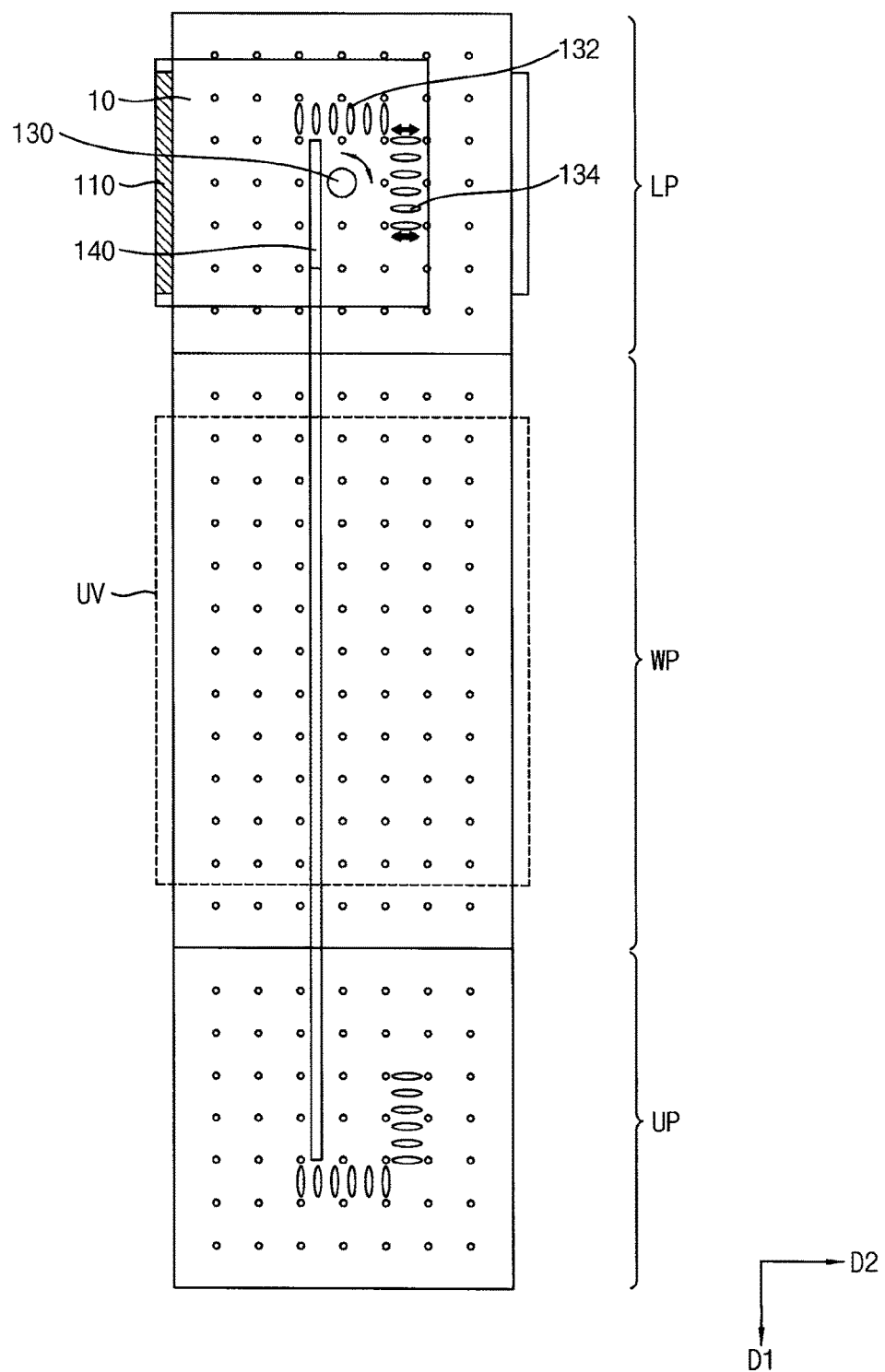
FIGS. 6A to 6U are plan views to explain an operation of the exposure apparatus of FIG. 1 and an exposure method using the exposure apparatus.
Figure 6C:
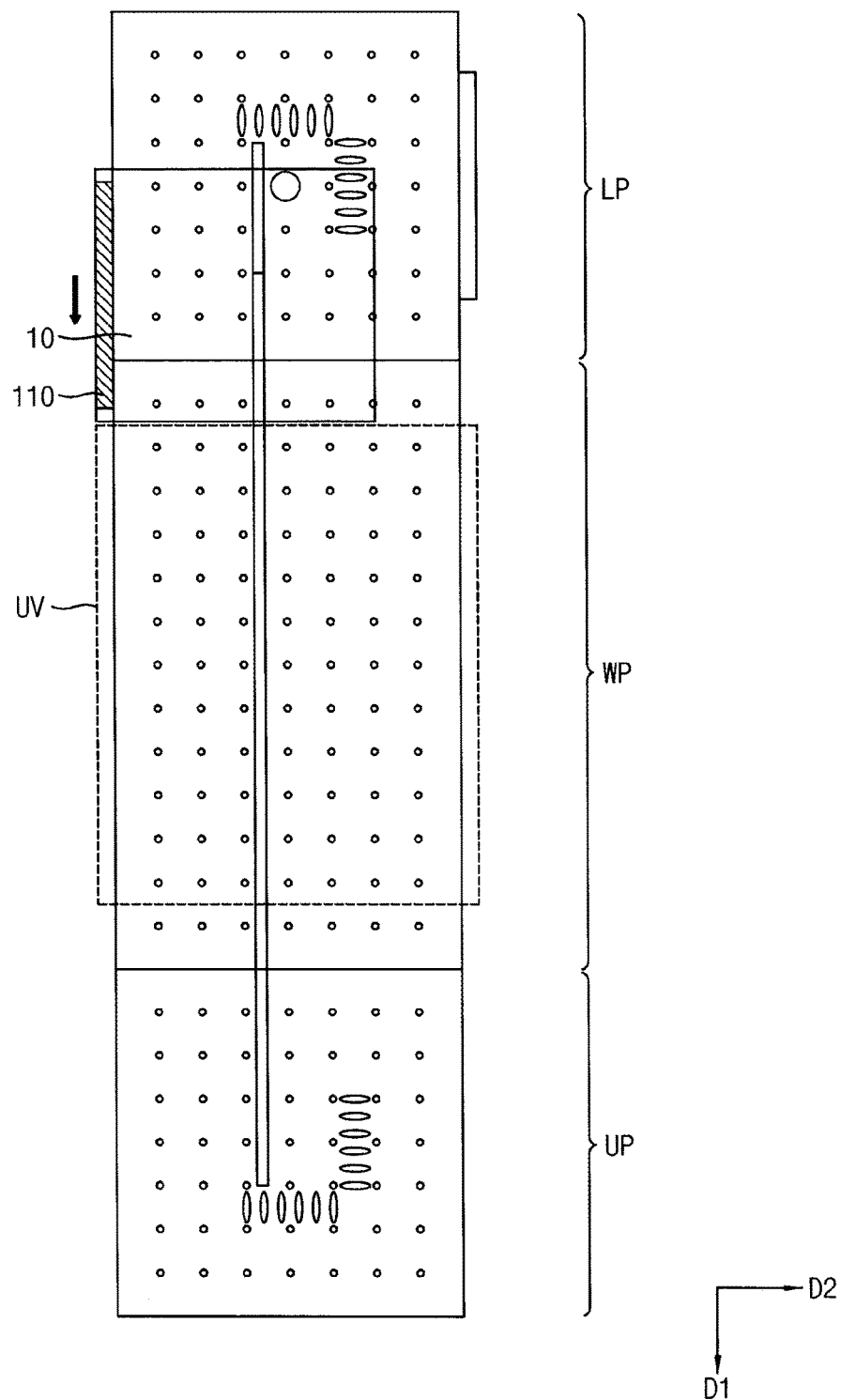
Figure 6D:
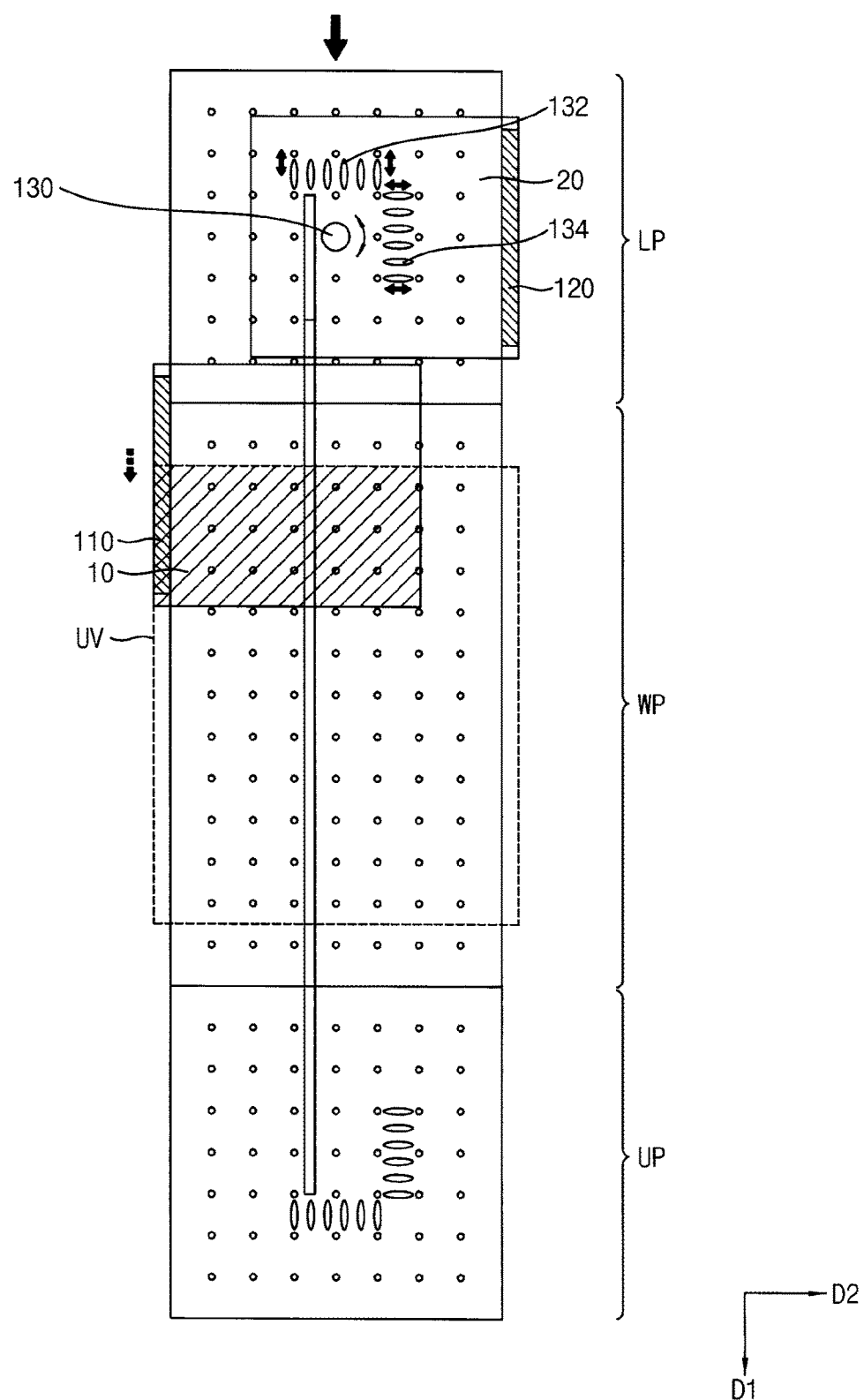
Figure 6E:
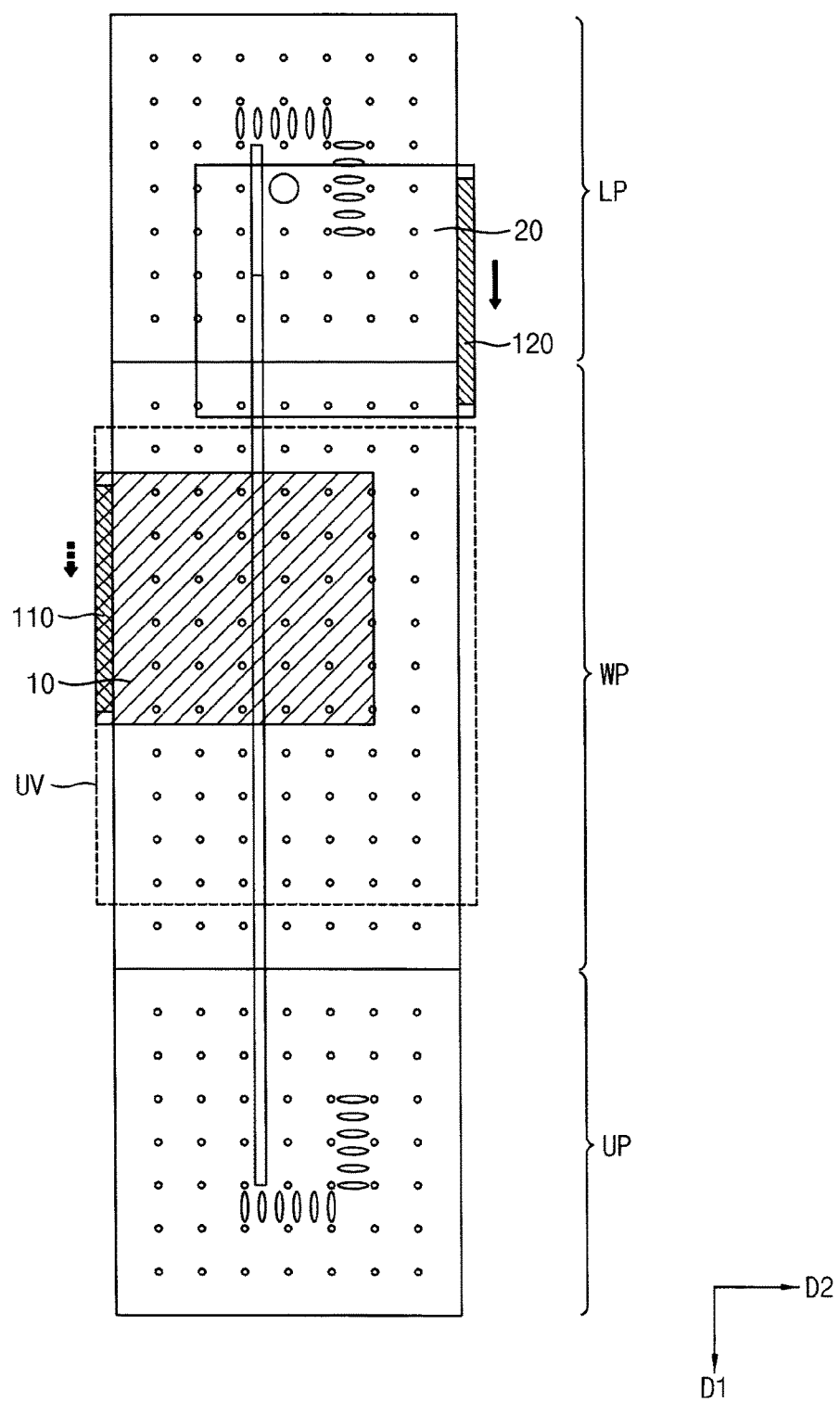
Figure 6F:
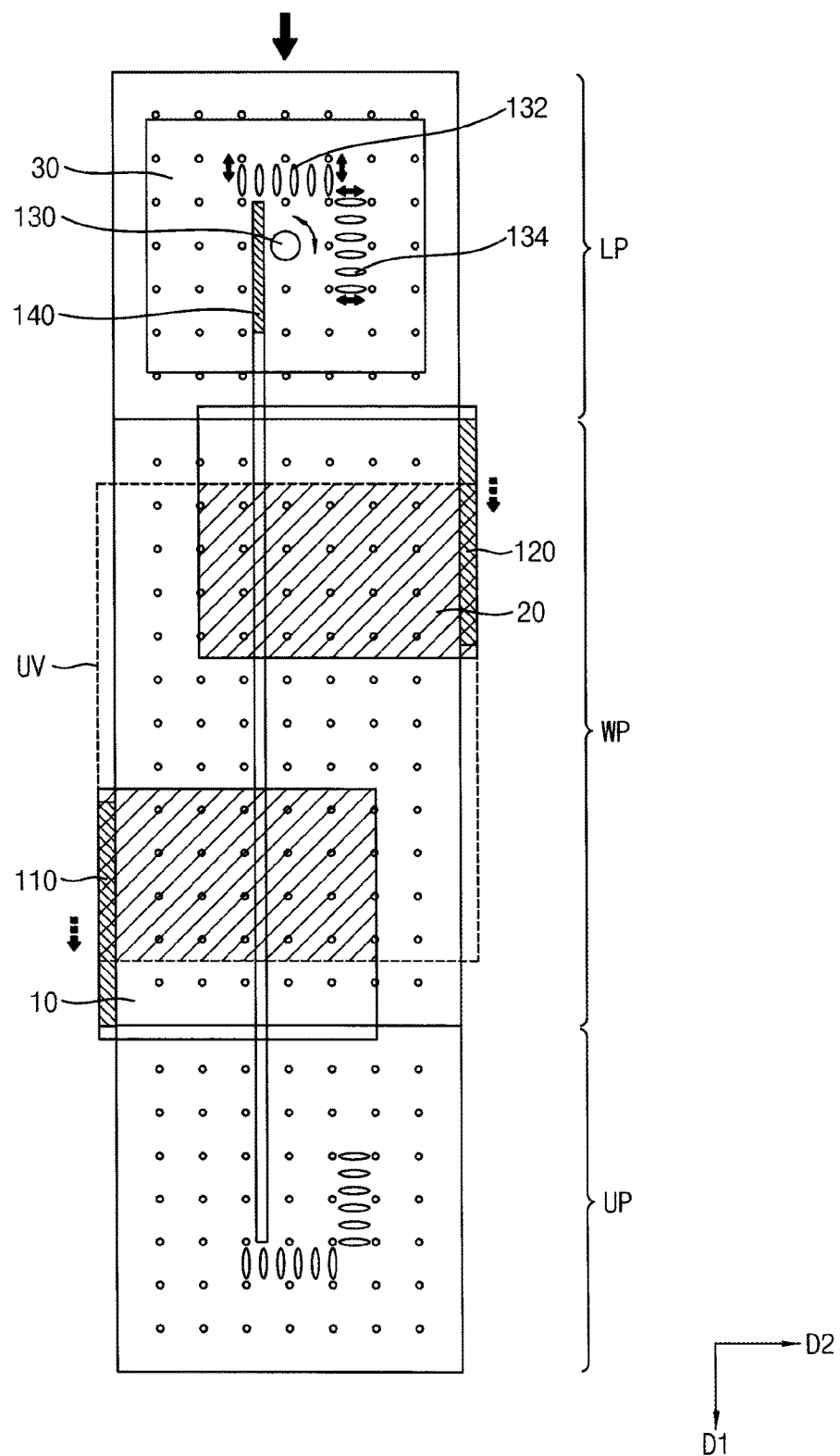
Figure 6G:
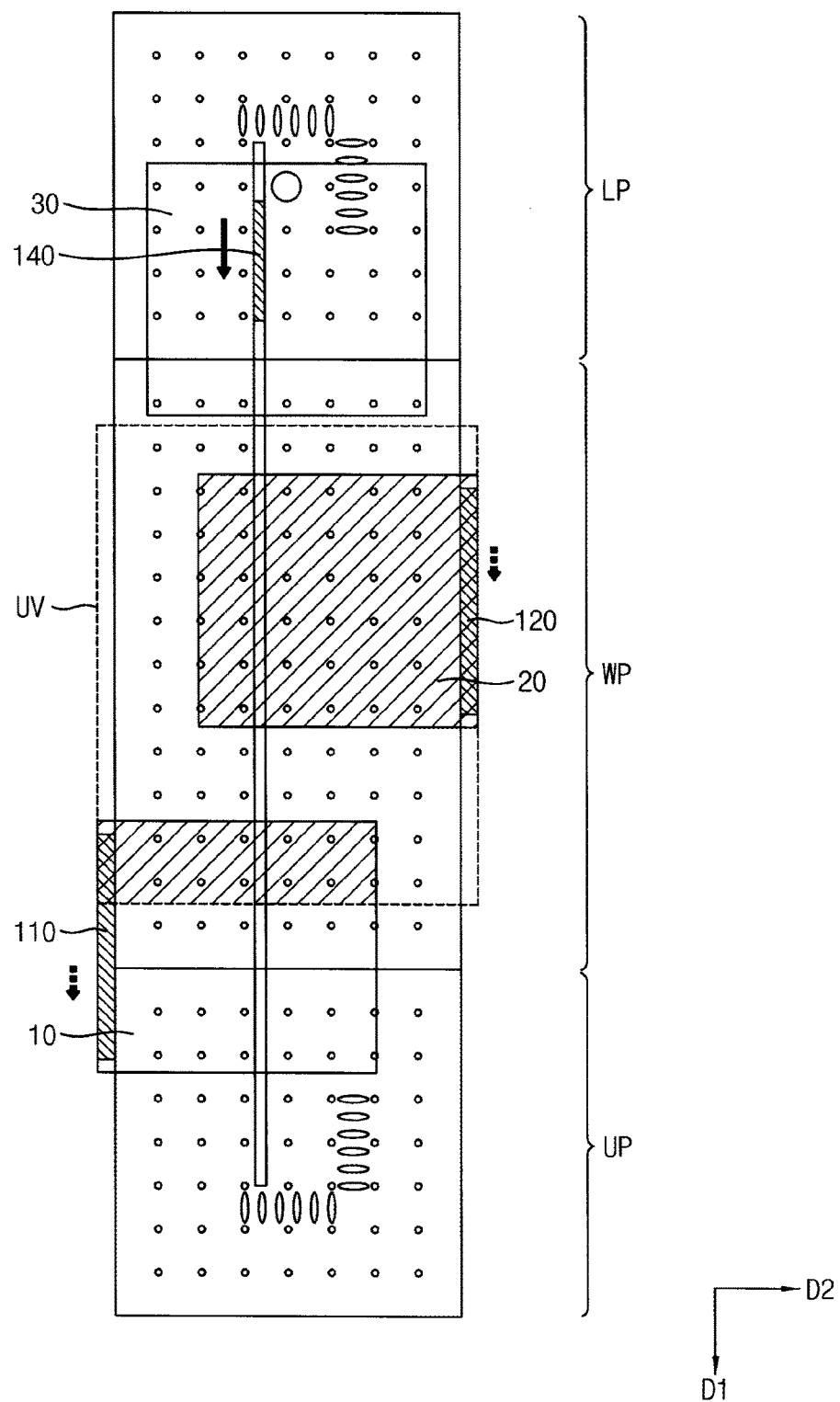
Figure 6H:
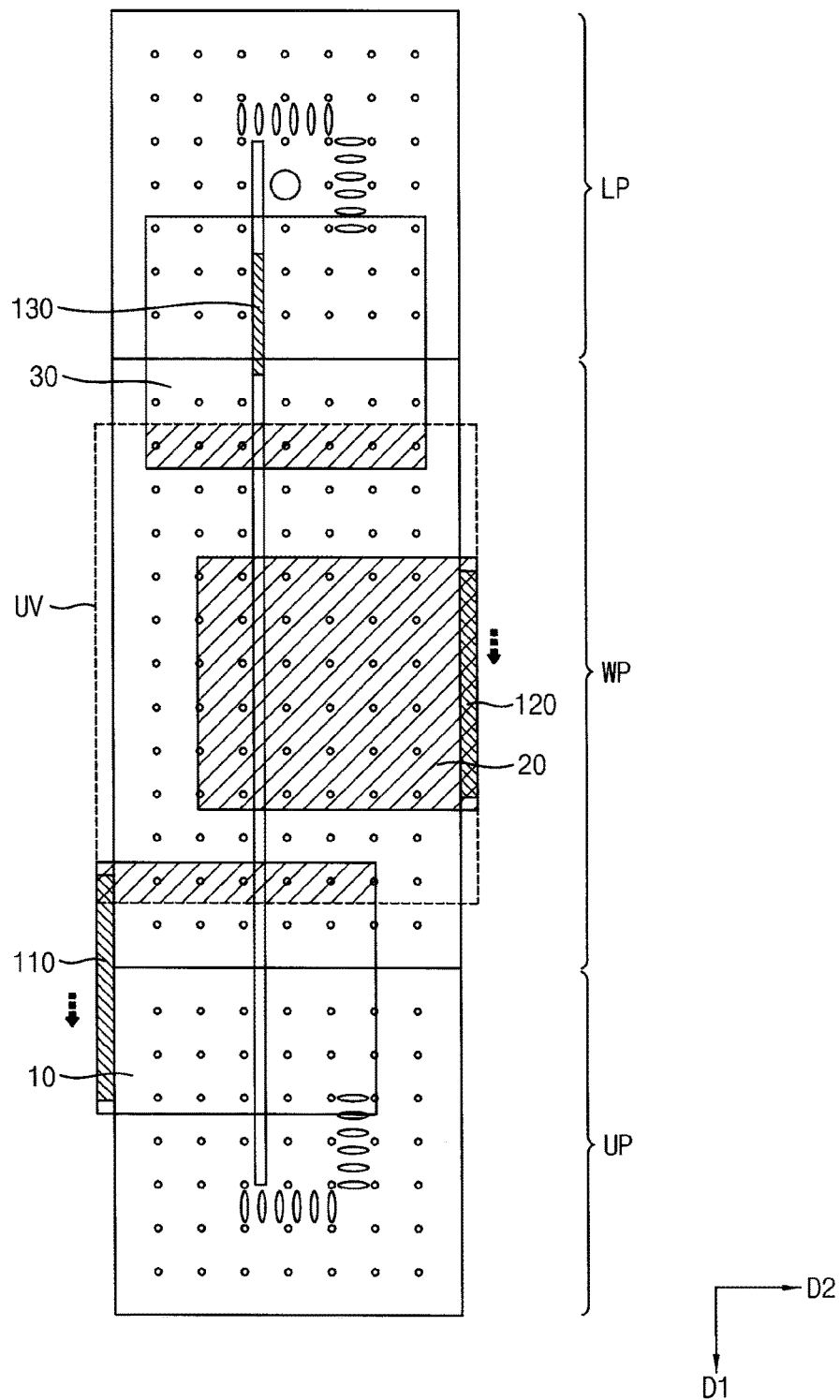
Figure 61:
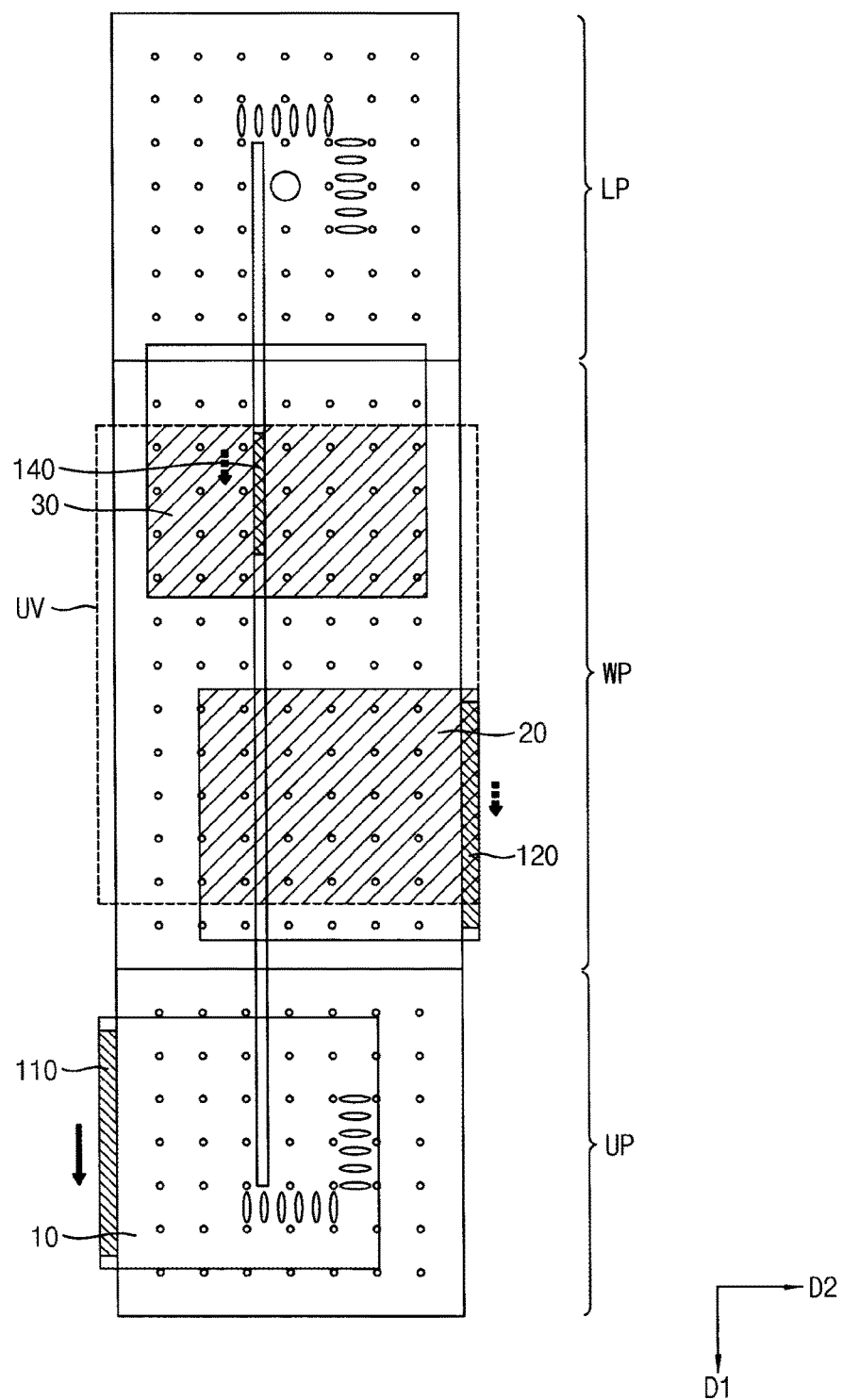
Figure 6J:
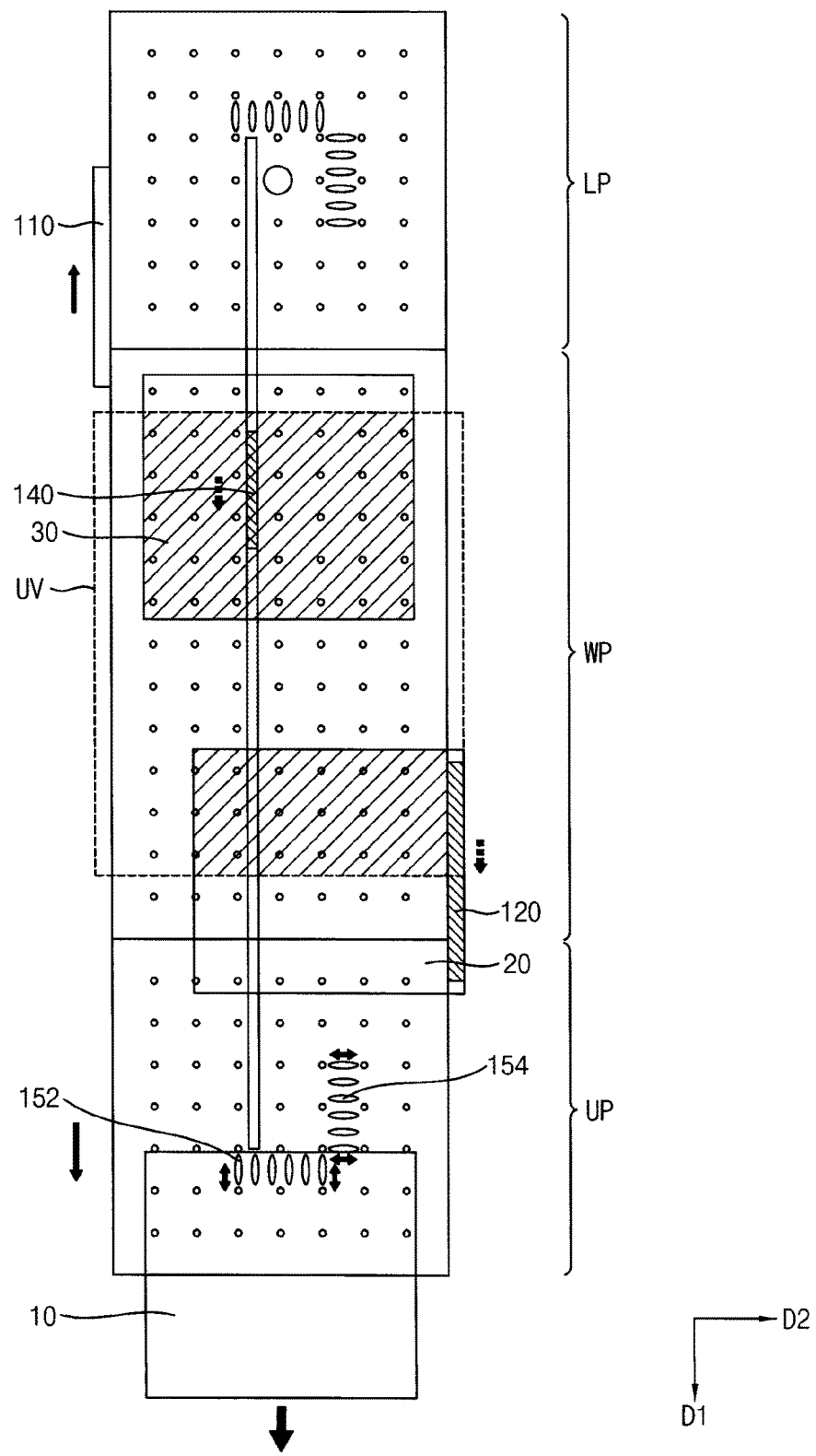
Figure 6K:
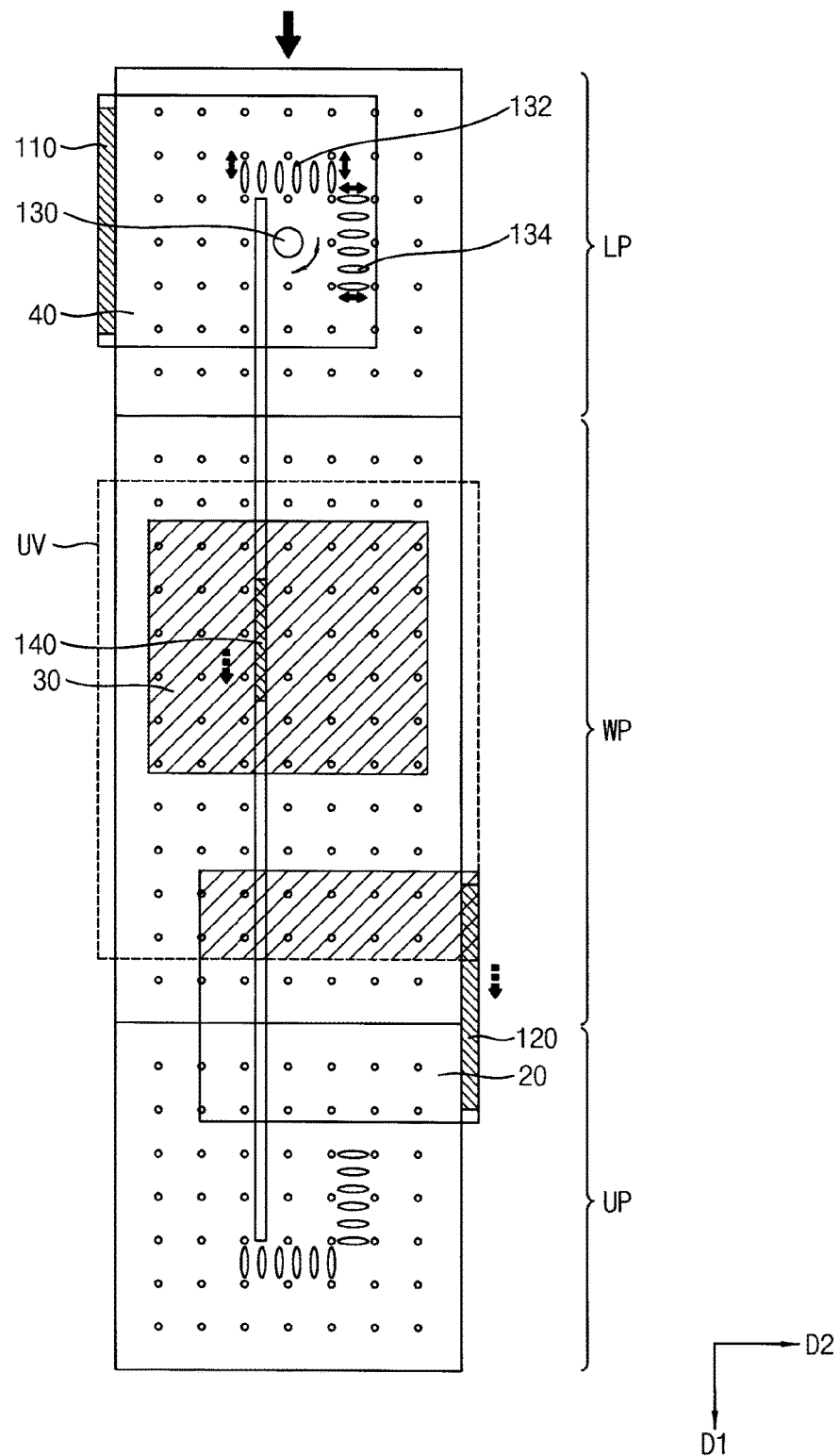
Figure 6L:
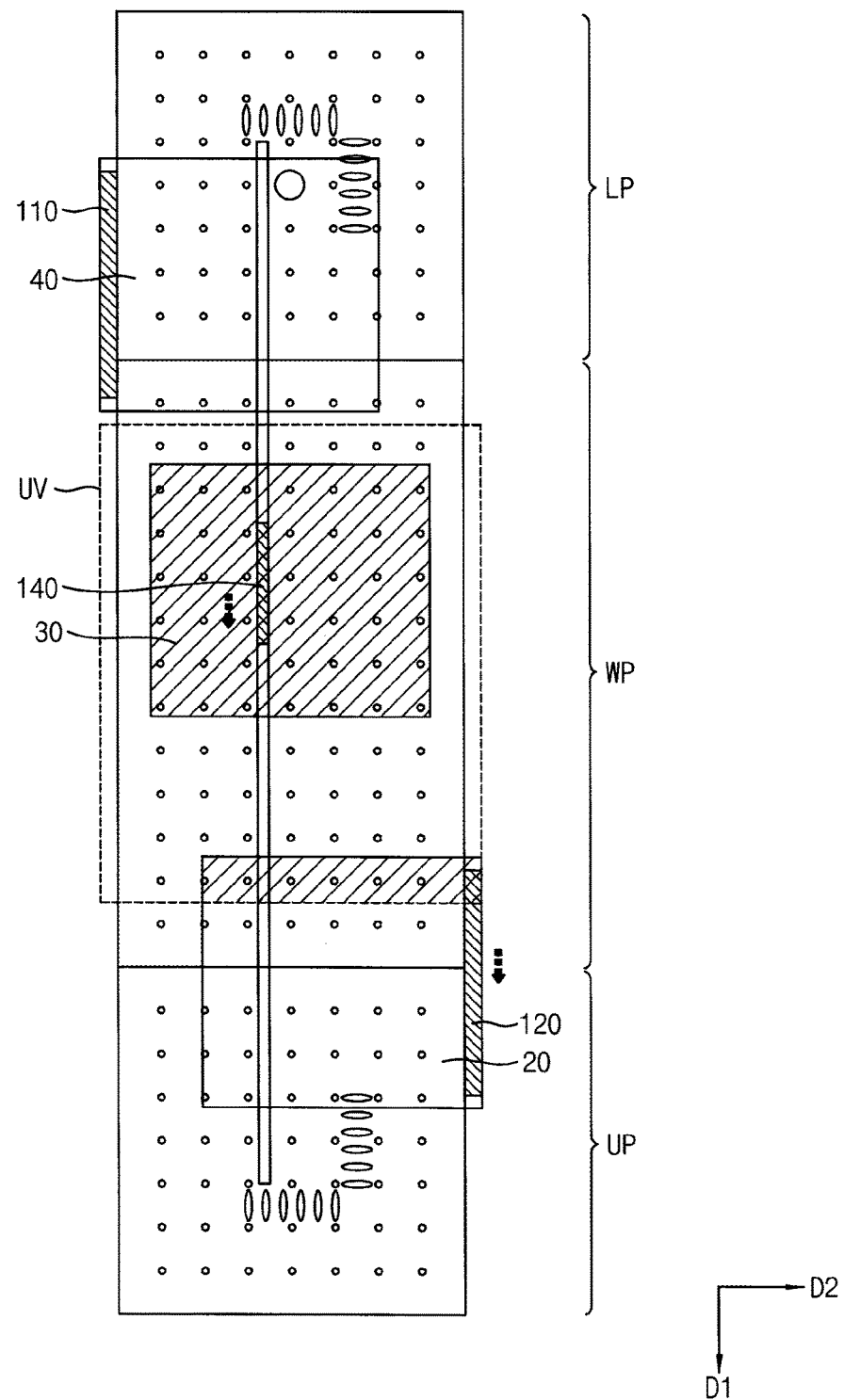
Figure 6M:
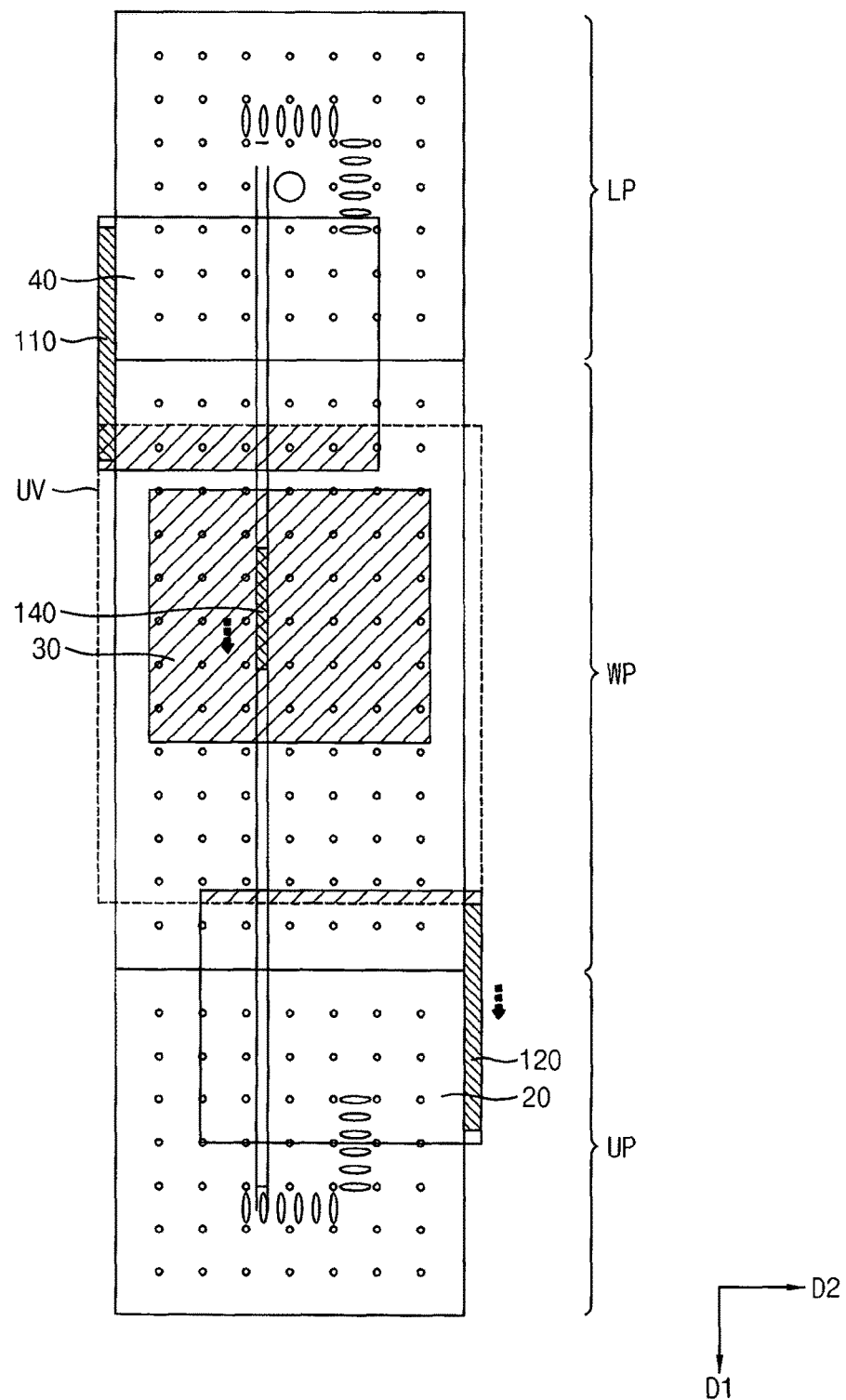
Figure 6N:
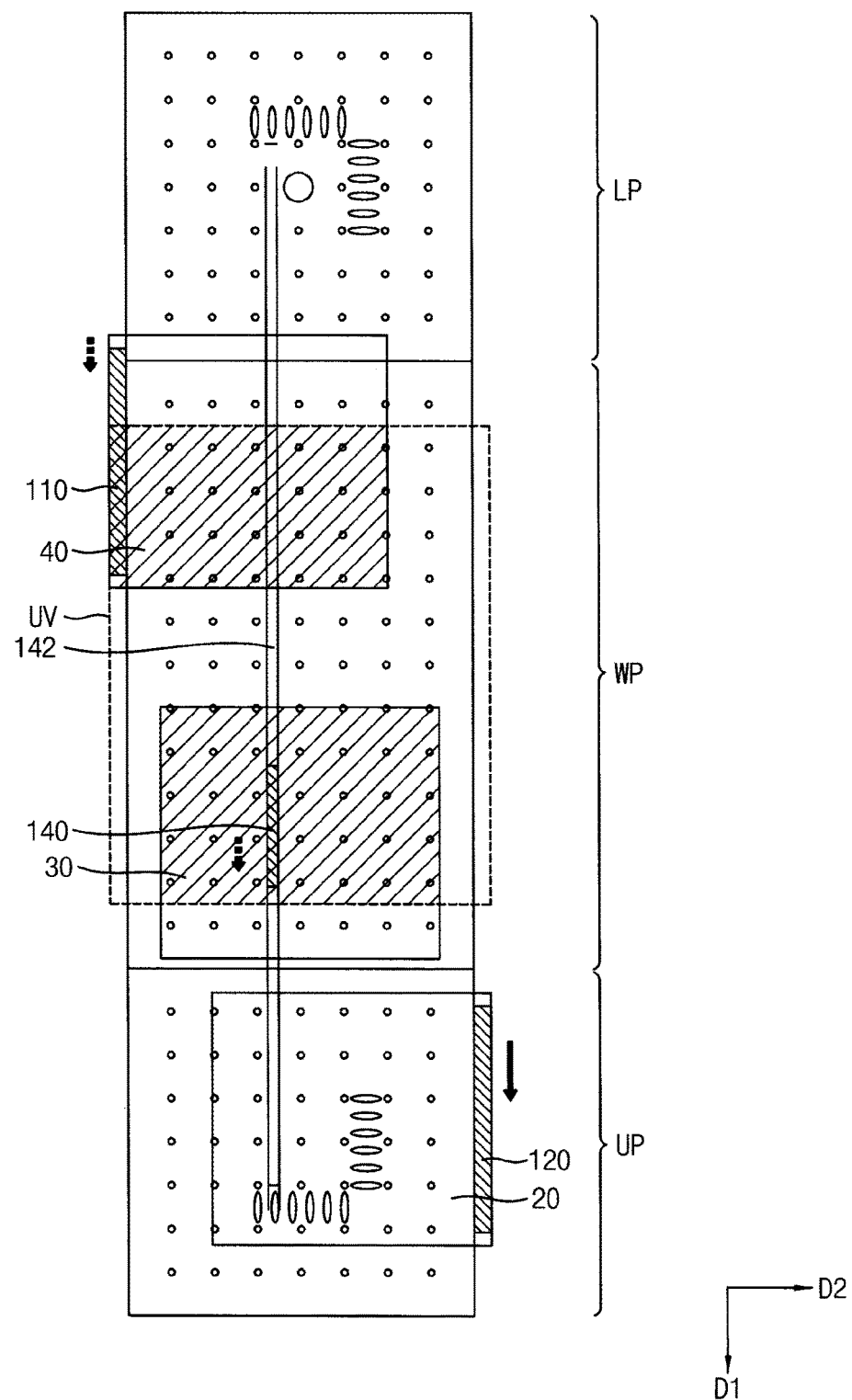
Figure 60:
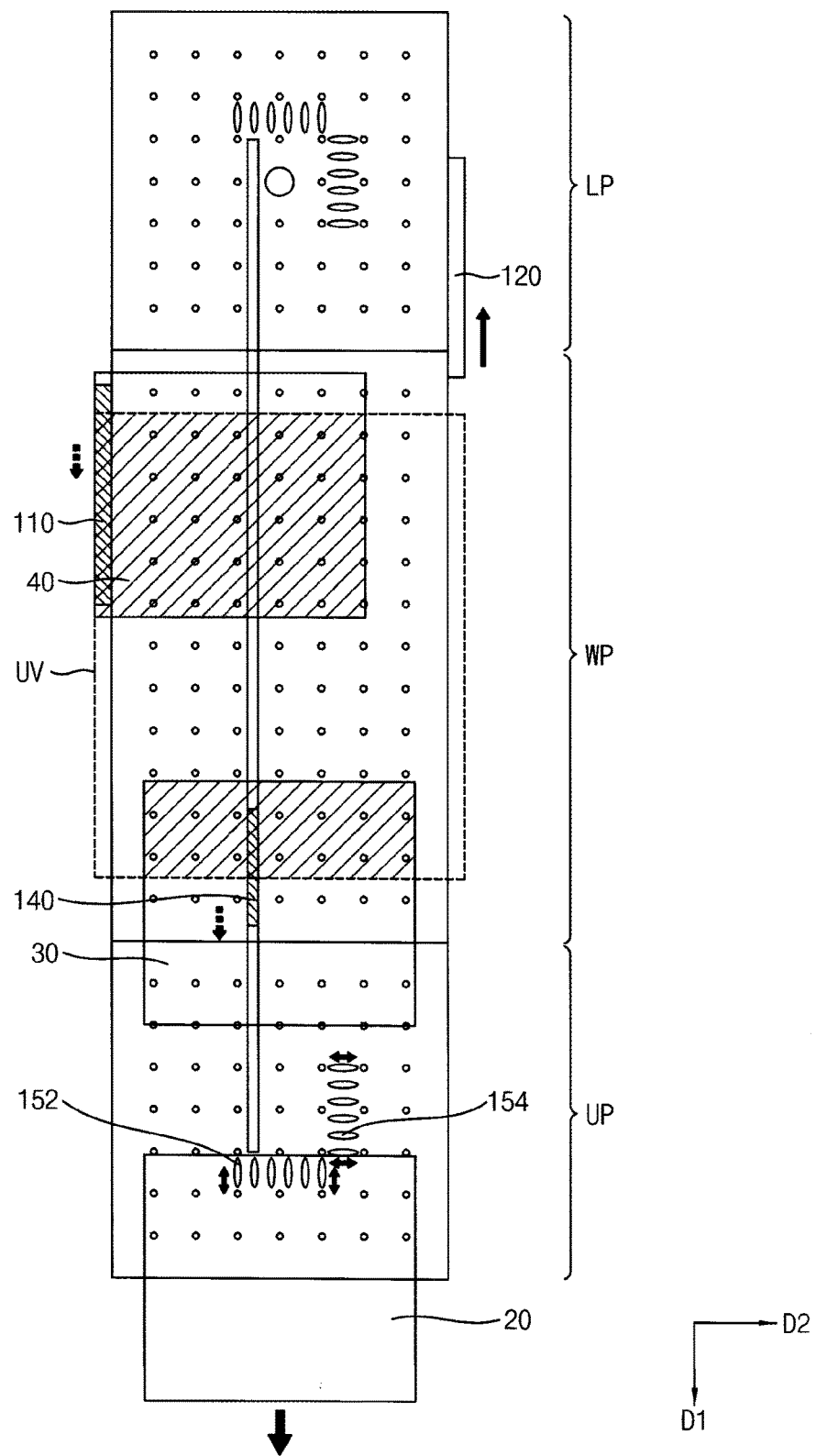
Figure 6P:
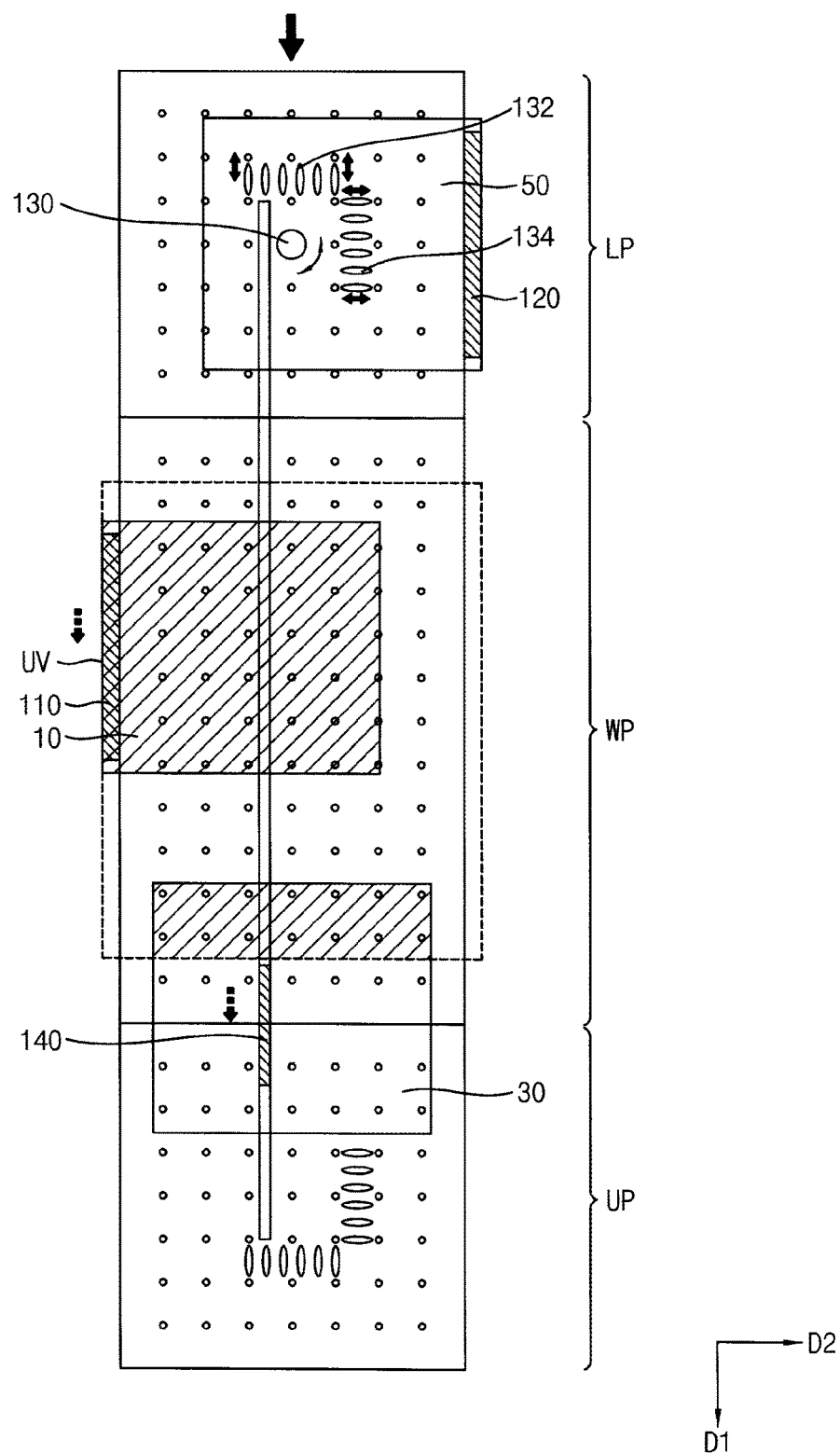
Figure 6Q:
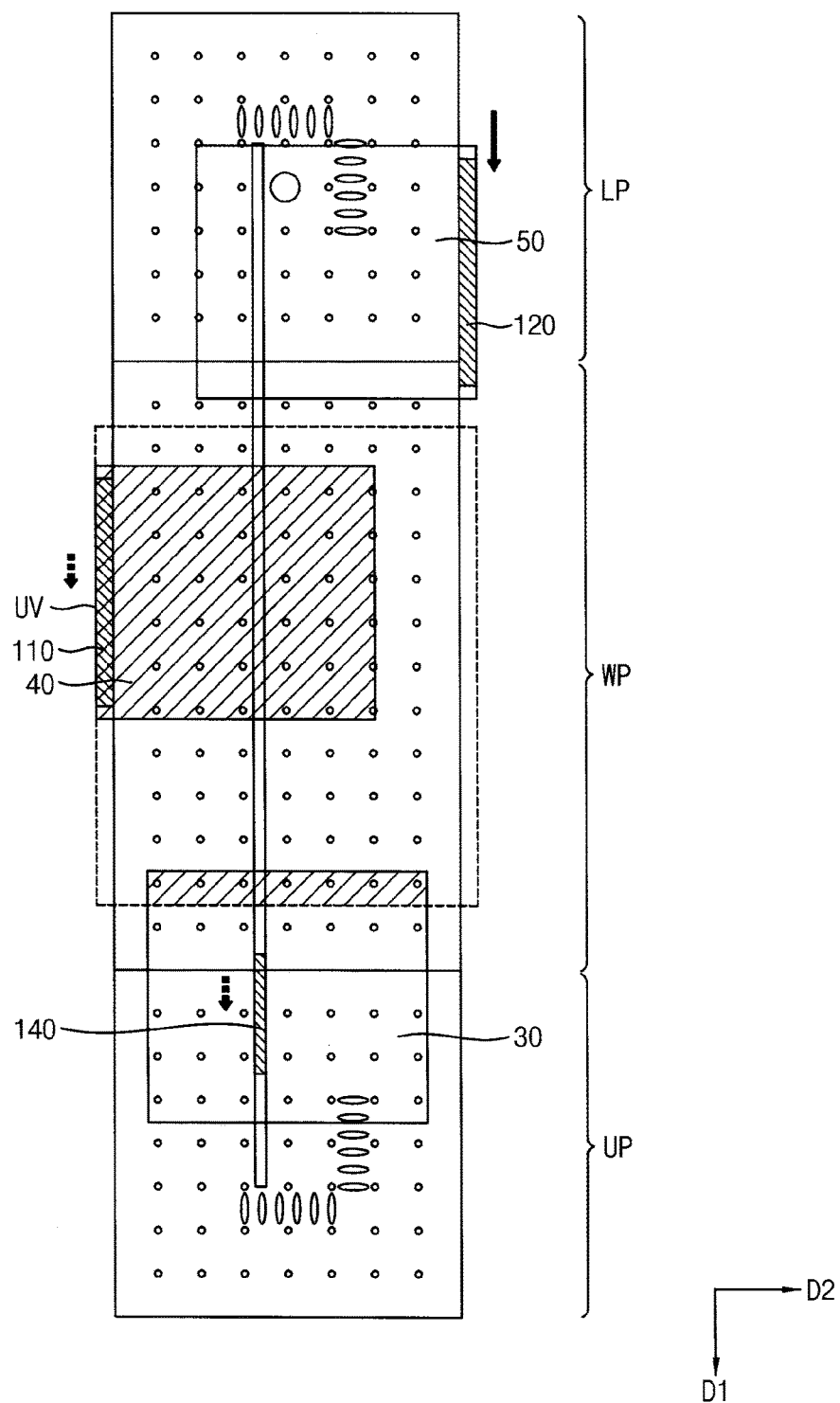
Figure 6R:
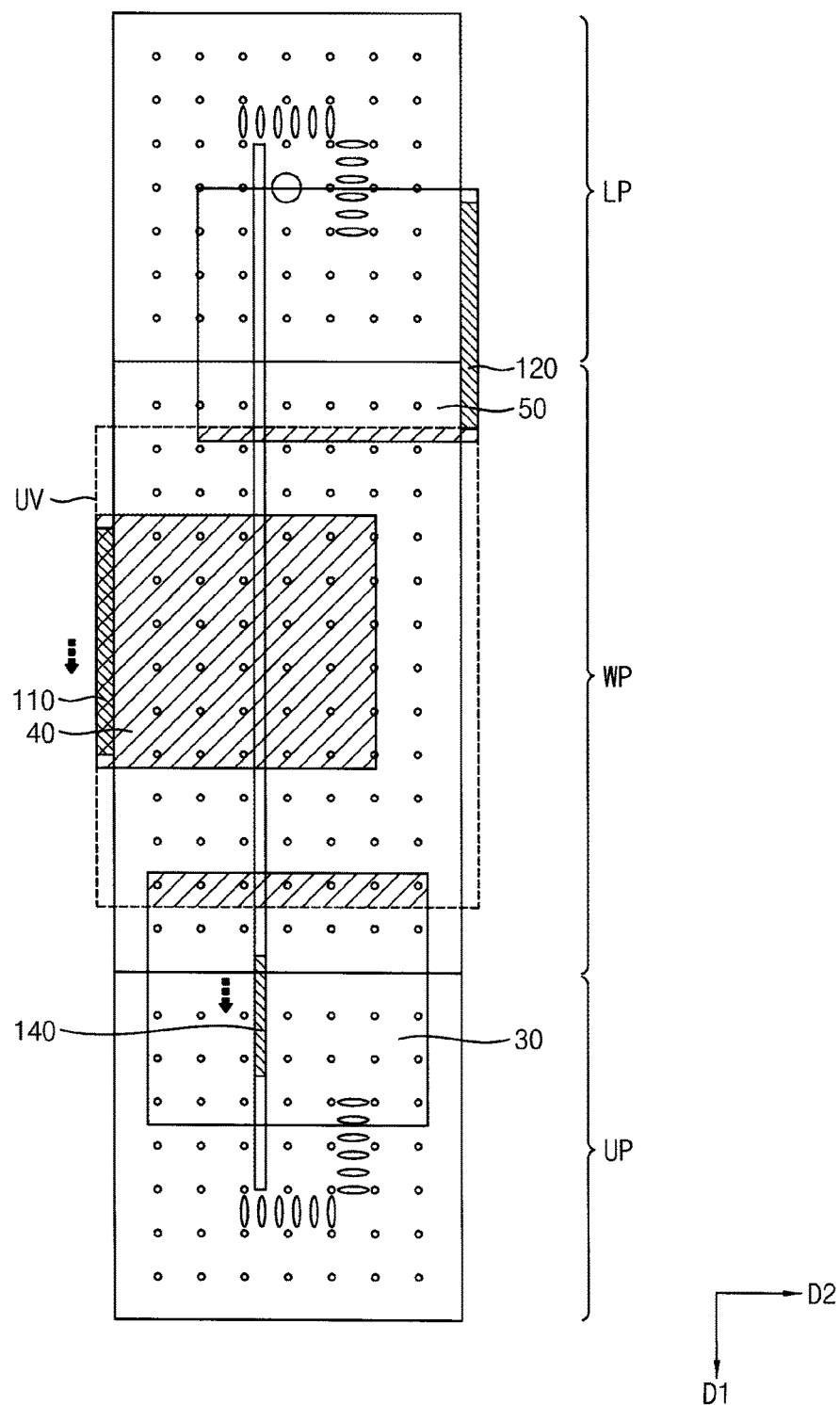
Figure 6S:
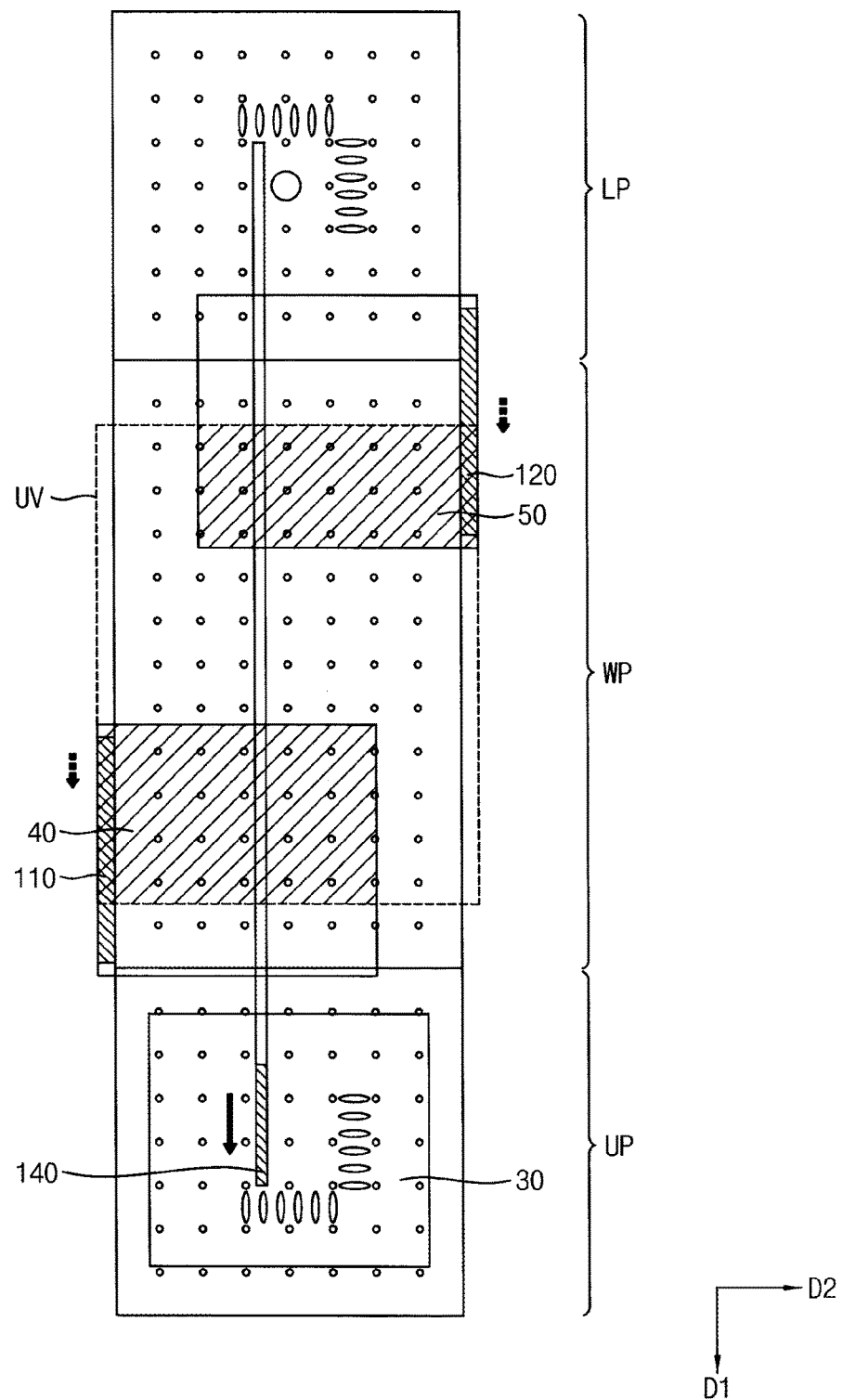
Figure 6T:
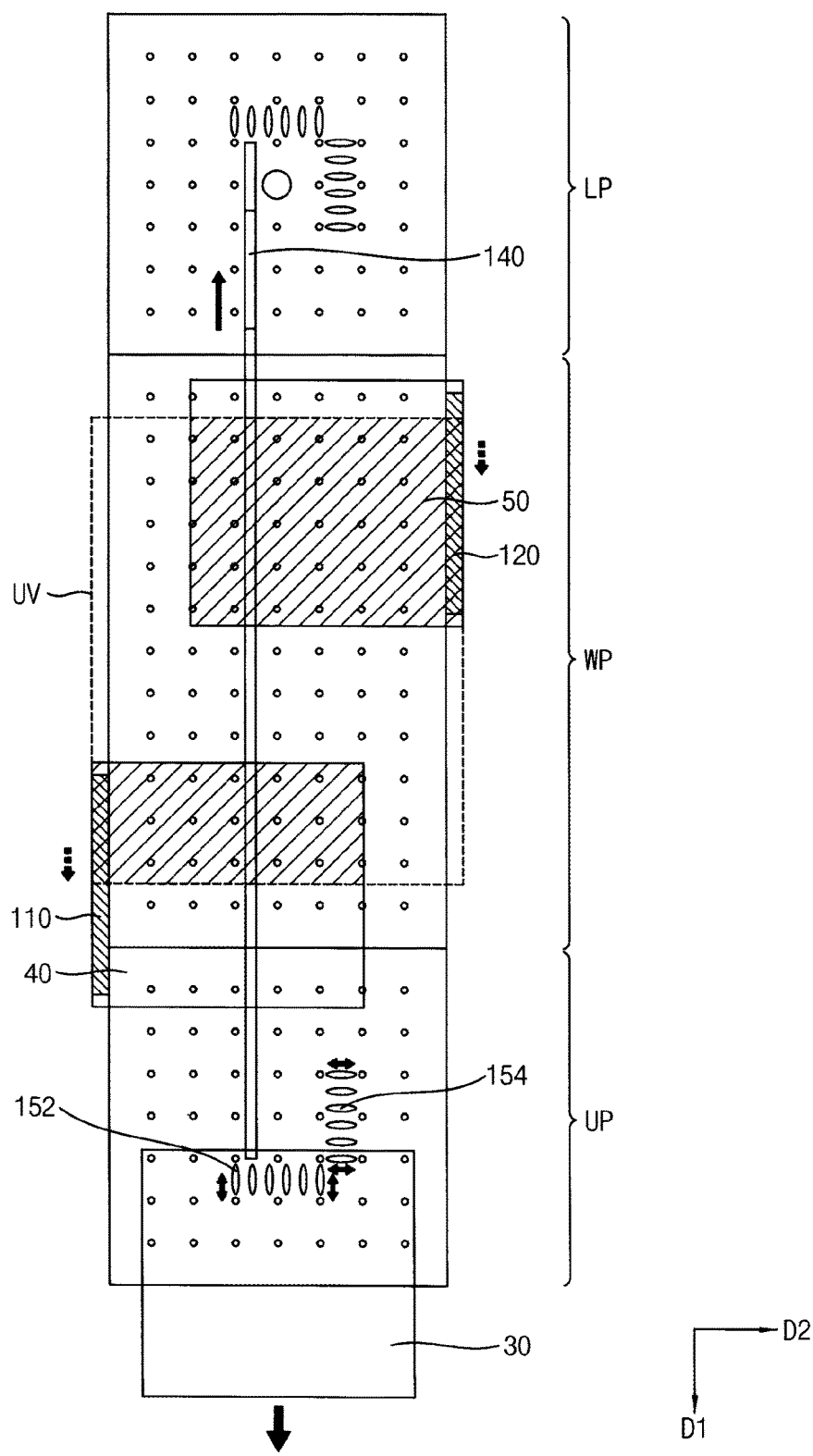

FIGS. 6A to 6T are plan views to explain an operation of the exposure apparatus of FIG. 4 and an exposure method using the exposure apparatus.

The exposure method is similar to an exposure method of FIGS. 5A to 5O, except for a third gripper of the exposure apparatus and a size of an exposure area of the exposure apparatus which is larger than that of FIGS. 5A to 5O.

Referring to FIG. 6A, the exposure apparatus includes a first gripper 110, a second gripper 120, a third gripper 140 and a loading portion LP, a working portion WP and an unloading portion UP which are disposed in the first direction in order. A plurality of air holes AH is formed on the loading portion LP, the working portion WP and the unloading portion UP. Air cushion is formed by blowing air though the air hole AH. Thus, the substrate may be transferred to a first direction D1 and a second direction D2 with air cushioned. The loading portion LP includes a substrate rotator 130, a first loading roller 132 and a second loading roller 134. An exposure area UV on which an ultra violet ray is irradiated is formed on the working portion WP. The unloading portion UP includes a first unloading roller 152 and a second unloading roller 154.

The third gripper may move in a first direction D1 along a third guiding part 142 which extends in the first direction D1 on the loading portion LP, the working portion WP and the unloading portion UP.

A first substrate 10 is loaded on the loading portion LP in the first direction D1. (refers to an arrow in figures) The first loading roller 132 rotates to move the first substrate 10 to a position corresponding to the first gripper 110 in the first direction D1.

Referring to FIG. 6B, the second loading roller 134 rotates to move the first substrate 10 in the second direction D2 to place edge of the first substrate 10 on the first gripper 110. The substrate rotator 130 may be attached on the first substrate 10, and then the substrate rotator 130 rotates, so that the edge of the first substrate 10 may be disposed in parallel with the first direction D1. At this time, a first substrate 10 is pictured by a camera (refers to 300 of FIG. 3), and the first and second loading roller 132 and 134 and the substrate rotator 130 are operated to align the first substrate 10 in a predetermined direction. As needed, the substrate rotator 130 may rotate the first substrate 10, so that the first substrate 10 have a proper tilt angle with respect to the first direction D1.

After alignment of the first substrate 10, the first gripper 110 may be attached on the first substrate 10 to fix the first substrate 10.

Referring to FIG. 6C, the first gripper 110 moves in the first direction D1 to transfer the first substrate 10 just in front of the exposure area UV. At this time, movement of the first gripper 110 may be faster than movement of the first gripper 110 in the exposure area UV. (refers to an arrow in the figure)

Referring to FIG. 6D, movement of the first gripper 110 in the exposure area UV may be slower than movement of the first gripper 110 out of the exposure area UV in the first direction D1. Thus, the first substrate 10 may be irradiated by an ultra violet ray in the exposure area UV. (refers to a dotted arrow in the figure)

As the first substrate 10 is transferred to the first direction D1, the first substrate 10 passes out of the loading portion LP, and a second substrate 20 is loaded on the loading portion LP at the same time. The second substrate 20 is attached on the second gripper positioned on the opposite side of the loading portion LP.

For example, the second substrate 20 is loaded on the loading portion LP in the first direction D1. (refers to an arrow in the figure) The first loading roller 132 rotates to move the substrate 10 to a position corresponding to the second gripper 120 in the first direction D1. The second loading roller 134 rotates to move the second substrate 20 in the second direction D2 to place edge of the second substrate 20 on the second gripper 120. The substrate rotator 130 may be attached on the second substrate 20, and then the substrate rotator 130 rotates, so that the edge of the second substrate 20 may be disposed in parallel with the first direction D1. At this time, the second substrate 20 is pictured by the camera, and the first and second loading roller 132 and 134 and the substrate rotator 130 are operated to align the second substrate 20 in a predetermined direction. As needed, the substrate rotator 130 may rotate the second substrate 20, so that the second substrate 20 have a proper tilt angle with respect to the first direction D1. After alignment of the second substrate 20, the second gripper 120 may be attached on the second substrate 20 to fix the second substrate 20.

Referring to FIG. 6E, the first gripper 110 may move relatively slowly in the first direction D1. Thus, the first substrate 10 may be irradiated by the ultra violet ray in the exposure area UV. (refers to a dotted arrow in the figure)

At the same time, the second gripper 120 moves in the first direction D1 to transfer the second substrate 20 just in front of the exposure area UV. At this time, movement of the second gripper 120 may be faster than movement of the second gripper 120 in the exposure area UV. (refers to an arrow in the figure)

Referring to FIG. 6F, the first gripper 110 may relatively slowly move in the first direction D1. Thus, the first substrate 10 may be irradiated by the ultra violet ray in the exposure area UV. (refers to a dotted arrow in the figure)

At the same time, the second gripper 120 may relatively slowly move in the first direction D1 comparing to movement of second gripper 120 out of the exposure area UV. Thus, the second substrate 20 may be irradiated by the ultra violet ray in the exposure area UV. (refers to a dotted arrow in the figure)

At the same time, a third substrate 30 is loaded on the loading portion LP, and attached on the third gripper 140 while irradiating the second substrate by the ultra violet ray.

For example, the third substrate 30 may be loaded on the loading portion LP in the first direction D1. (refers to an arrow in the figure) The first loading roller 132 rotates to move the third substrate 30 to a position corresponding to the third gripper 140 in the first direction D1. The second loading roller 134 rotates to move the third substrate 30 in the second direction D2 to place the third substrate 30 on the third gripper 140. The substrate rotator 130 may be attached on the third substrate 30, and then the substrate rotator 130 rotates, so that the edge of the third substrate 30 may be disposed in parallel with the first direction D1. At this time, the third substrate 30 is pictured by the camera, and the first and second loading roller 132 and 134 and the substrate rotator 130 are operated to align the third substrate 30 in a predetermined position. As needed, the substrate rotator 130 may rotate the third substrate 30, so that the third substrate 30 have a proper tilt angle with respect to the first direction D1. After alignment of the third substrate 30, the third gripper 140 may be attached on the third substrate 30 to fix the third substrate 30.

Referring to FIG. 6G, the first gripper 110 may move relatively slowly in the first direction D1. Thus, the first substrate 10 may be irradiated by the ultra violet ray in the exposure area UV. (refers to a dotted arrow in the figure)

At the same time, the second gripper 120 may move relatively slowly in the first direction D1. Thus, the second substrate 20 may be irradiated by the ultra violet ray in the exposure area UV. (refers to a dotted arrow in the figure)

At the same time, the third gripper 140 moves in the first direction D1 to transfer the third substrate 30 just in front of the exposure area UV. At this time, movement of the third gripper 140 may be faster than movement of the third gripper 140 in the exposure area UV. (refers to an arrow in the figure)

Referring to FIG. 6H, the first gripper 110 may move relatively slowly in the first direction D1. Thus, the first substrate 10 may be irradiated by the ultra violet ray in the exposure area UV. (refers to a dotted arrow in the figure)

At the same time, the second gripper 120 may move relatively slowly in the first direction D1 comparing to movement of second gripper 120 out of the exposure area UV. Thus, the second substrate 20 may be irradiated by the ultra violet ray in the exposure area UV. (refers to a dotted arrow in the figure)

At the same time, the third gripper 140 moves relatively slowly in the first direction D1 comparing to movement of third gripper 130 out of the exposure area UV Thus, the third substrate 30 may be irradiated by the ultra violet ray in the exposure area UV.

Thus, the first substrate 10, the second substrate 20 and the third substrate 30 may be irradiated in the exposure area UV, simultaneously.

Referring to FIG. 6I, the first gripper 110 moves in the first direction D1, so that the first substrate 10 is transferred to the unloading portion UP. At this time, the first gripper 110 may move relatively quickly comparing to movement of the first gripper 110 in the exposure area UV. (refers to an arrow in the figure)

At the same time, the second gripper 120 may move relatively slowly in the first direction D1. Thus, the second substrate 20 may be irradiated by the ultra violet ray in the exposure area UV. (refers to a dotted arrow in the figure)

At the same time, the third gripper 140 moves relatively slowly in the first direction D1. Thus, the third substrate 30 may be irradiated by the ultra violet ray in the exposure area UV. (refers to an arrow in the figure)

Referring to FIG. 6J, the first substrate 10 may be separated from the first gripper 110. After that, the second unloading roller 154 rotates to move the first substrate 10 until the first substrate 10 reaches a center of the unloading portion UP in the second direction D2. After that, the first unloading roller 152 rotates to move the first substrate 10 in the first direction D1, so that the first substrate 10 may be unloaded from the unloading portion UP. (refers to an arrow in the figure)

At the same time, the first gripper 110 moves opposite direction of the first direction D1, and returned to the loading portion LP. (refers to an arrow in the figure)

At the same time, the second gripper 120 may move relatively slowly in the first direction D1. Thus, the second substrate 20 may be irradiated by the ultra violet ray in the exposure area UV. (refers to a dotted arrow in the figure)

At the same time, the third gripper 140 moves relatively slowly in the first direction D1. Thus, the third substrate 30 may be irradiated by the ultra violet ray in the exposure area UV. (refers to an arrow in the figure)

Referring to FIG. 6K, the second gripper 120 may relatively slowly move in the first direction D1. Thus, the second substrate 20 may be irradiated by the ultra violet ray in the exposure area UV. (refers to a dotted arrow in the figure)

At the same time, the third gripper 140 may relatively slowly move in the first direction D1. Thus, the third substrate 30 may be irradiated by the ultra violet ray in the exposure area UV. (refers to a dotted arrow in the figure)

At the same time a fourth substrate 40 is loaded on the loading portion LP, and attached on the first gripper 110.

For example, the fourth substrate 40 may be loaded on the loading portion LP in the first direction D1. (refers to an arrow in the figure) The first loading roller 132 rotates to move the fourth substrate 40 to a position corresponding to the first gripper 110 in the first direction D1. The second loading roller 134 rotates to move the fourth substrate 40 in the second direction D2 to place edge of the fourth substrate 40 on the first gripper 110. The substrate rotator 130 may be attached on the third substrate 30, and then the substrate rotator 130 rotates, so that the edge of the fourth substrate 40 may be disposed in parallel with the first direction D1. At this time, the fourth substrate 40 is pictured by the camera, and the first and second loading roller 132 and 134 and the substrate rotator 130 are operated to align the fourth substrate 40. As needed, the substrate rotator 130 may rotate the fourth substrate 40, so that the fourth substrate 40 have a proper tilt angle with respect to the first direction D1. After alignment of the fourth substrate 40, the first gripper 110 may be attached on fourth substrate 40 to fix the fourth substrate 40.

Referring to FIG. 6L, the second gripper 120 may move relatively slowly in the first direction D1. Thus, the second substrate 20 may be irradiated by the ultra violet ray in the exposure area UV. (refers to a dotted arrow in the figure)

At the same time, the third gripper 140 may move relatively slowly in the first direction D1. Thus, the third substrate 30 may be irradiated by the ultra violet ray in the exposure area UV. (refers to a dotted arrow in the figure)

At the same time, the first gripper 110 moves in the first direction D1 to transfer the fourth substrate 40 just in front of the exposure area UV. At this time, movement of the first gripper 110 may be faster than movement of the first gripper 110 in the exposure area UV.

Referring to FIG. 6M, the second gripper 120 may move relatively slowly in the first direction D1. Thus, the second substrate 20 may be irradiated by the ultra violet ray in the exposure area UV. (refers to a dotted arrow in the figure)

At the same time, the third gripper 140 may move relatively slowly in the first direction D1. Thus, the third substrate 30 may be irradiated by the ultra violet ray in the exposure area UV. (refers to a dotted arrow in the figure)

At the same time, the first gripper 110 may move relatively slowly in the first direction D1. Thus, the fourth substrate 40 may be irradiated by the ultra violet ray in the exposure area UV. (refers to a dotted arrow in the figure)

Thus, the first substrate 10, the second substrate 20, the third substrate 30 and the fourth substrate 40 may be irradiated in the exposure area UV, simultaneously.

Referring to FIG. 6N, the second gripper 120 moves in the first direction D1, so that the second substrate 20 is transferred to the unloading portion UP. At this time, the second gripper 120 may move relatively quickly comparing to movement of the second gripper 120 in the exposure area UV. (refers to an arrow in the figure)

At the same time, the third gripper 140 may move relatively slowly in the first direction D1. Thus, the third substrate 30 may be irradiated by the ultra violet ray in the exposure area UV. (refers to a dotted arrow in the figure)

At the same time, the first gripper 110 may move relatively slowly in the first direction D1. Thus, the fourth substrate 40 may be irradiated by the ultra violet ray in the exposure area UV. (refers to a dotted arrow in the figure)

Referring to FIG. 6O, the second substrate 20 may be separated from the second gripper 120. After that, the second unloading roller 154 rotates to move the first substrate 10 until the second substrate 20 reaches a center of the unloading portion UP in the second direction D2. After that, the first unloading roller 152 rotates to move the second substrate 20 in the first direction D1, so that the second substrate 20 may be unloaded from the unloading portion UP. (refers to an arrow in the figure)

At the same time, the second gripper 120 moves opposite direction of the first direction D1, and returned to the loading portion LP. (refers to an arrow in the figure)

At the same time, the third gripper 140 may move relatively slowly in the first direction D1. Thus, the third substrate 30 may be irradiated by the ultra violet ray in the exposure area UV. (refers to a dotted arrow in the figure)

At the same time, the first gripper 110 may move relatively slowly in the first direction D1. Thus, the fourth substrate 40 may be irradiated by the ultra violet ray in the exposure area UV. (refers to a dotted arrow in the figure)

Referring to FIG. 6P, the third gripper 140 may move relatively slowly in the first direction D1. Thus, the third substrate 30 may be irradiated by the ultra violet ray in the exposure area UV. (refers to a dotted arrow in the figure)

At the same time, the first gripper 110 may relatively slowly move in the first direction D1. Thus, the fourth substrate 40 may be irradiated by the ultra violet ray in the exposure area UV. (refers to a dotted arrow in the figure)

At the same time, a fifth substrate 50 is loaded on the loading portion LP, and attached on the second gripper 120.

For example, the fifth substrate 50 may be loaded on the loading portion LP in the first direction D1. (refers to an arrow in the figure) The first loading roller 132 rotates to move the third substrate 30 to a position corresponding to the second gripper 120 in the first direction D1. The second loading roller 134 rotates to move the fifth substrate 50 in the second direction D2 to place edge of the fifth substrate 50 on the second gripper 120. The substrate rotator 130 may be attached on the fifth substrate 50, and then the substrate rotator 130 rotates, so that the edge of the fifth substrate 50 may be disposed in parallel with the first direction D1. At this time, the fifth substrate 50 is pictured by the camera, and the first and second loading roller 132 and 134 and the substrate rotator 130 are operated to align the fifth substrate 50. As needed, the substrate rotator 130 may rotate the fifth substrate 50, so that the fifth substrate 50 have a proper tilt angle with respect to the first direction D1. After alignment of the fifth substrate 50, the second gripper 120 may be attached on the third fifth substrate 50 to fix the fifth substrate 50.

Referring to FIG. 6Q, the third gripper 140 may move relatively slowly in the first direction D1. Thus, the third substrate 30 may be irradiated by the ultra violet ray in the exposure area UV. (refers to a dotted arrow in the figure)

At the same time, the first gripper 110 may move relatively slowly in the first direction D1. Thus, the fourth substrate 40 may be irradiated by the ultra violet ray in the exposure area UV. (refers to a dotted arrow in the figure)

At the same time, the second gripper 120 moves in the first direction D1 to transfer the fifth substrate 50 just in front of the exposure area UV. At this time, movement of the second gripper 120 may be faster than movement of the second gripper 120 in the exposure area UV. (refers to an arrow in the figure)

Referring to FIG. 6R, the third gripper 140 may move relatively slowly in the first direction D1. Thus, the third substrate 30 may be irradiated by the ultra violet ray in the exposure area UV. (refers to a dotted arrow in the figure)

At the same time, the first gripper 110 may move relatively slowly in the first direction D1. Thus, the fourth substrate 40 may be irradiated by the ultra violet ray in the exposure area UV. (refers to a dotted arrow in the figure)

At the same time, the second gripper 120 may move relatively slowly in the first direction D1. Thus, the fifth substrate 50 may be irradiated by the ultra violet ray in the exposure area UV. (refers to a dotted arrow in the figure)

Thus, the third substrate 30, fourth substrate 40 and the fifth substrate 50 may be irradiated in the exposure area UV, simultaneously.

Referring to FIG. 6S, the third gripper 140 moves in the first direction D1, so that the third substrate 30 is transferred to the unloading portion UP. At this time, the third gripper 130 may move relatively quickly comparing to movement of the third gripper 130 in the exposure area UV. (refers to an arrow in the figure)

At the same time, the first gripper 110 may move relatively slowly in the first direction D1. Thus, the fourth substrate 40 may be irradiated by the ultra violet ray in the exposure area UV. (refers to a dotted arrow in the figure)

At the same time, the second gripper 120 may move relatively slowly in the first direction D1. Thus, the fifth substrate 50 may be irradiated by the ultra violet ray in the exposure area UV. (refers to a dotted arrow in the figure)

Referring to FIG. 6T, the third substrate 30 may be separated from the third gripper 130. After that, the second unloading roller 154 rotates to move the third substrate 30 until the third substrate 30 reaches a center of the unloading portion UP in the second direction D2. After that, the first unloading roller 152 rotates to move the third substrate 30 in the first direction D1, so that the third substrate 30 may be unloaded from the unloading portion UP. (refers to an arrow in the figure)

At the same time, the third gripper 130 moves opposite direction of the first direction D1, and returned to the loading portion LP. (refers to an arrow in the figure)

At the same time, the first gripper 110 may move relatively slowly in the first direction D1. Thus, the fourth substrate 40 may be irradiated by the ultra violet ray in the exposure area UV. (refers to a dotted arrow in the figure)

At the same time, the second gripper 120 may move relatively slowly in the first direction D1. Thus, the fifth substrate 50 may be irradiated by the ultra violet ray in the exposure area UV. (refers to a dotted arrow in the figure)

Figure 6U:
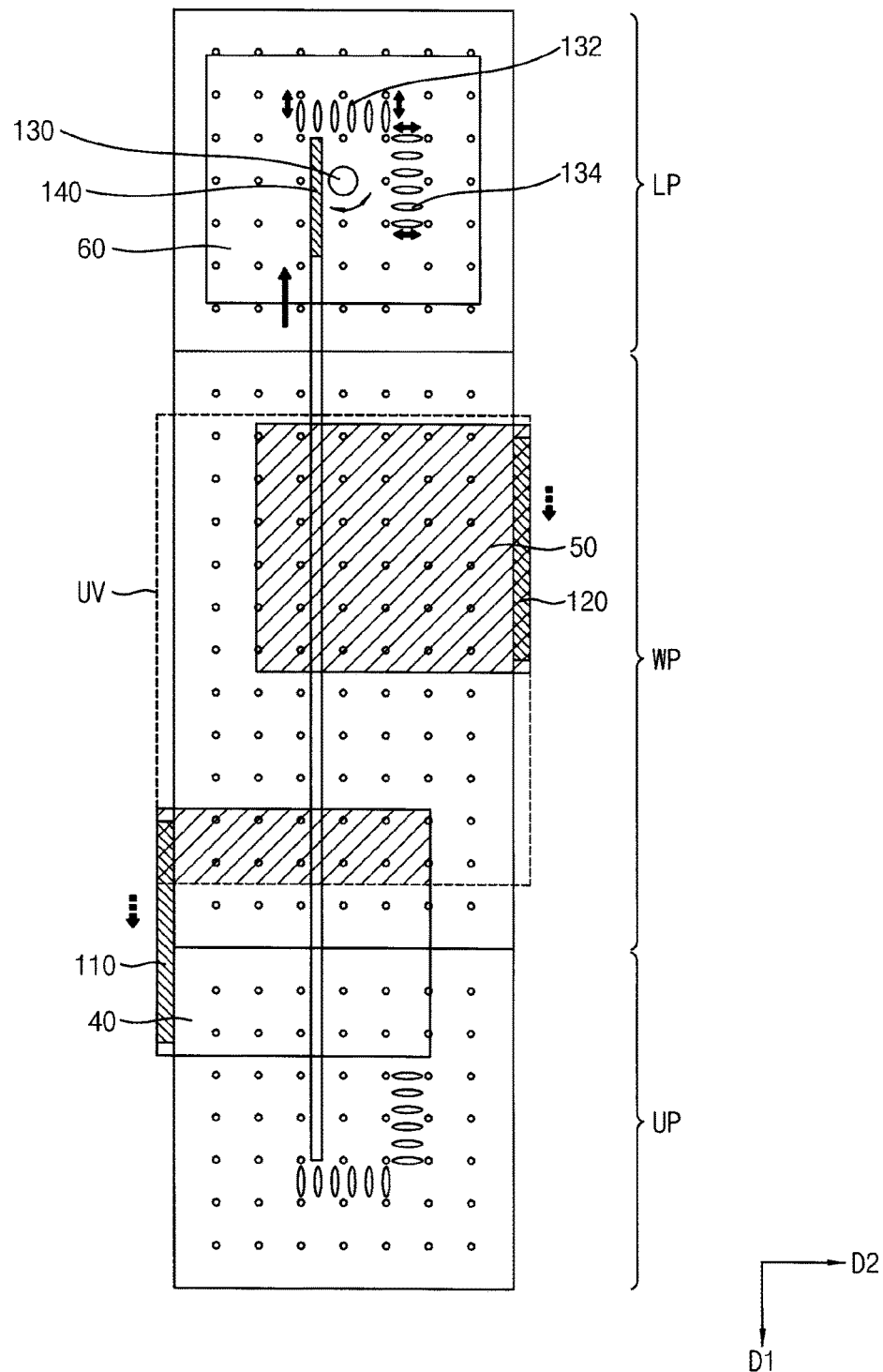

Referring to FIG. 6U, the first gripper 110 may move relatively slowly in the first direction D1. Thus, the fourth substrate 40 may be irradiated by the ultra violet ray in the exposure area UV. (refers to a dotted arrow in the figure)

At the same time, the second gripper 120 may move relatively slowly in the first direction D1. Thus, the fifth substrate 50 may be irradiated by the ultra violet ray in the exposure area UV. (refers to a dotted arrow in the figure)

At the same time, a sixth substrate 60 is loaded on the loading portion LP, and attached on the second gripper 120.

For example, the sixth substrate 60 may be loaded on the loading portion LP in the first direction D1. (refers to an arrow in the figure) The first loading roller 132 rotates to move the sixth substrate 60 to a position corresponding to the third gripper 130 in the first direction D1. The second loading roller 134 rotates to move the sixth substrate 60 in the second direction D2 to place the sixth substrate 60 on the third gripper 130. The substrate rotator 130 may be attached on the sixth substrate 60, and then the substrate rotator 130 rotates, so that the edge of the sixth substrate 60 may be disposed in parallel with the first direction D1. At this time, the sixth substrate 60 is pictured by the camera, and the first and second loading roller 132 and 134 and the substrate rotator 130 are operated to align the sixth substrate 60. As needed, the substrate rotator 130 may rotate the sixth substrate 60, so that the sixth substrate 60 have a proper tilt angle with respect to the first direction D1. After alignment of the sixth substrate 60, the third gripper 130 may be attached on the sixth substrate 60 to fix the sixth substrate 60.

Repeating the process of FIGS. 6A to 6U, a plurality of substrates may be transferred in the first direction D1 in order during an exposure process. The exposure method includes a step that three continuous substrates are simultaneously irradiated, so that working time may be decreased.

Referring again to FIGS. 6A and 6U, the exposure method using the exposure apparatus includes loading a first substrate, moving the first substrate relatively quickly in a first speed in a loading portion LP in which the substrate is not irradiated by the ultra violet ray, irradiating the first substrate in the working portion WP while moving the substrate in a second speed relatively slower than the first speed, irradiating the first substrate by the ultra violet ray in the working portion WP while loading a second substrate in a loading portion LP, irradiating the first substrate while moving the second substrate in a first speed in the loading portion LP, irradiating the first and second substrates simultaneously in the working portion WP while loading a third substrate in the loading portion LP, irradiating the first and second substrates by the ultra violet ray in the working portion WP and moving the third substrate in the first speed, irradiating the first, second and third substrates, moving the first substrate relatively quickly in the first speed in the unloading portion UP while irradiating the second and third substrates in the working portion WP, unloading the first substrate while irradiating the second and third substrates in the working portion WP, and irradiating the second and third substrates in the working portion WP while loading a fourth substrate.

The exposure method implements a simultaneous irradiation of three substrate and increases moving speed when the substrates are not irradiated by the UV light, so that alignment time of the substrate may be decreased. Thus, throughput of the apparatus for the photo-alignment process may be enhanced.

Figure 7:
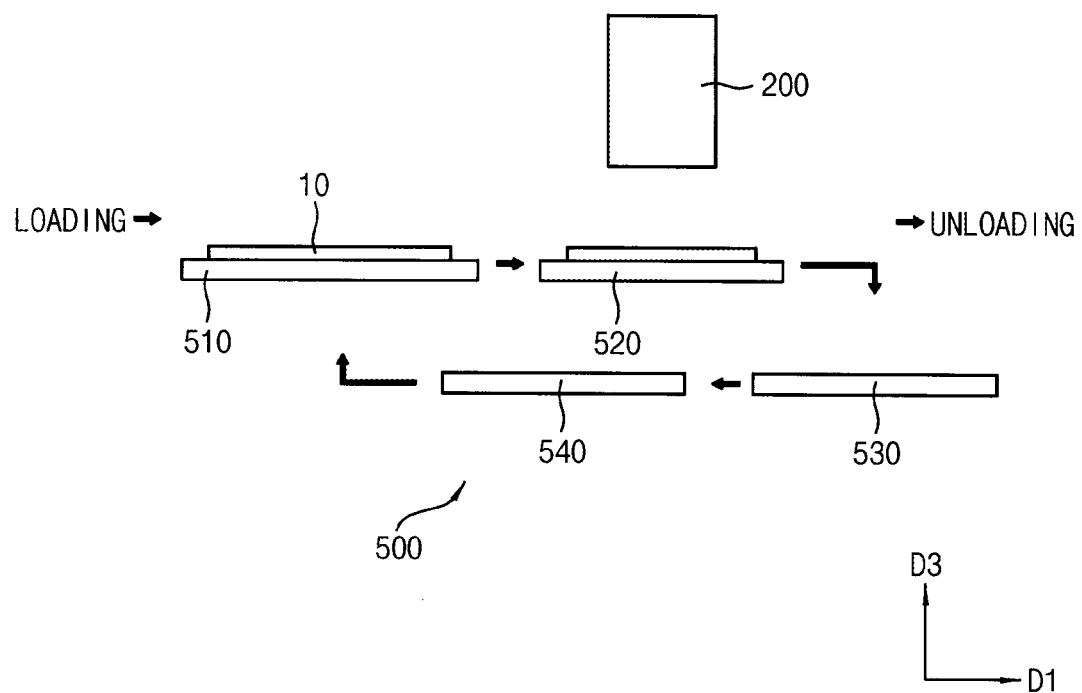
FIG. 7 is a perspective view briefly illustrating an exposure apparatus according to an exemplary embodiment of inventive concept.

FIG. 7 is a perspective view briefly illustrating an exposure apparatus according to an exemplary embodiment of inventive concept.

Referring to FIG. 7, an exposure apparatus is substantially the same as an exposure apparatus of FIG. 1, except that the exposure apparatus includes a plurality of carriers for transferring a plurality of substrates instead of grippers. Thus, any further detailed descriptions concerning the same elements will be omitted.

The exposure apparatus includes a first carrier 510, a second carrier 520, a third carrier 530 and a fourth carrier 540. The number of carriers is only illustrative and is not intended to be limiting in any way and may be more or less than four.

A substrate 10 is placed on the first to fourth carriers 510 to 540, so that a plurality of substrates may be irradiated by moving the substrates in a first direction D1. For example, the first to fourth carriers 510 to 540 may circularly move along arrows in the figure, so that the substrates may be transferred in the first direction D1.

The substrate 10 is loaded on the first carrier 510 (refers LOADING in figure), and then the first carrier 510 moves in the first direction D1 until the substrate 10 is disposed under the exposure part 200, and then the substrate 10 is irradiated. After that, the first carrier 510 moves in the first direction D1, so that the substrate 10 may be unloaded. (refers UNLOADING in figure) After that, the first carrier 510 is returned to the original position to load another substrate.

Thus, the first to fourth carriers 510 to 540 move circularly, so that a plurality of substrates may be transferred in the first direction D1. During the transferring, the substrates may be irradiated.

The exposure apparatus transfers a plurality of substrates using the first to fourth carriers in the present example embodiment, a plurality of carriers may be disposed at proper positions to continuously transfer the substrates as needed.

FIG. 8 is a perspective view briefly illustrating an exposure apparatus according to an exemplary embodiment of inventive concept.

Referring to FIG. 8, an exposure apparatus is substantially same as an exposure apparatus of FIGS. 1 to 3C, except for the first and second grippers 110 and 120. Thus, any further detailed descriptions concerning the same elements will be omitted.

The exposure apparatus includes a stage 100, an exposure part 200 and a camera 300. The stage 100 includes a loading portion LP, a working portion WP and an unloading portion UP which are disposed in the first direction in order. The stage 100 includes a first gripper 110 and a second gripper 120.

The loading portion LP includes a substrate rotator 130, a first loading roller 132 and a second loading roller 134. A plurality of air holes AH may be formed on surfaces of the loading portion LP, the working portion WP and the unloading portion UP.

The exposure part 200 includes a light source part 210, a first supporting part 220, a second supporting part 230, a tilt part 226 and a hinge part 232. The tilt part 226 includes a driving part 222 and a guide rail 224. The exposure part 200 irradiates an ultra violet ray to an exposure area UV of the working portion WP.

The exposure apparatus may further include a polarization measuring part 400. The polarization measuring part 400 may include a measuring portion 410, a first axis 430 and a second axis 420.

The first gripper 110 extends in a second direction D2 which is substantially perpendicular to the first direction D1. The first gripper 110 includes a first absorbing part 112 disposed to contact the substrate 10. The first absorbing part may include a porous material. A vacuum is formed on the first absorbing part, so that edge of the substrate 10 may be attached on the first absorbing part of the first gripper 110 to fix the substrate 10. The first gripper 110 may be move along the first direction D1 by a first guiding part 114 which extends in the first direction D1. Thus, as the first gripper 110 moves along the first direction D1, the substrate 10 may be transferred. The first guiding part 114 may be disposed adjacent to the stage 100. In addition, the first guiding part 114 may be disposed in the stage 100.

The second gripper 120, a second absorbing part 122 and the second guiding part 124 are substantially same as the first gripper 110, the first absorbing part 112 and the first guiding part 114, except that the second gripper 120, a second absorbing part 122 and the second guiding part 124 are disposed opposite to the first gripper 110, the first absorbing part 112 and the first guiding part 114 with respect to the loading portion LP, the working portion WP and the unloading portion UP.

Thus, the first and second grippers 110 and 120 may be attached at a front portion of the substrate which is transferred to the first direction D1. Thus, the first and second grippers 110 and 120 fix the front portion of the substrate 10, so that stable transferring of the substrate 10 may be possible.

In the present example embodiment, the first and second grippers 110 and 120 use vacuum to attach the substrate to the gripper, the first and second grippers 110 and 120 may have various types to move the substrate. For example the first and second grippers 110 and 120 may include chucks to grab the substrate, or include an adhesive material to attach the substrate.

According to the present inventive concept, an exposure apparatus includes first and second grippers which continuously transfer a plurality of substrates, the substrates may be transferred in a first direction in order and irradiated.

In addition, an exposure method using the exposure apparatus includes a step that two continuous substrates are simultaneously irradiated, so that working time may be decreased.

The foregoing embodiments are illustrative of the inventive concept and is not to be construed as limiting thereof.

Although a few exemplary embodiments of the inventive concept have been described, those skilled in the art will readily appreciate that many modifications are possible in the exemplary embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific exemplary embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. An exposure method comprising:
    loading a first substrate on a loading portion, the first substrate having a photo alignment agent which is coated on the first substrate;
    irradiating the first substrate by moving the first substrate in a first speed in a first direction to a working portion while
    loading a second substrate on the loading portion, the working portion having an ultra violet light source generating ultra violet ray to harden a photo alignment agent;
    simultaneously irradiating the first substrate and the second substrate by moving the first substrate and the second substrate in the first direction in the working portion; and
    unloading the first substrate from an unloading portion while irradiating the second substrate by moving the second substrate in the first direction in the working portion.

2. The exposure method of claim 1, between loading the first substrate and irradiating the first substrate, further comprising:
    moving the first substrate in a second speed in the first direction, the second speed being faster than the first speed.

3. The exposure method of claim 2, further comprising:
    between irradiating the first and second substrates, and unloading the first substrate while irradiating the second substrate,
    moving the first substrate in a third speed in the first direction, the third speed being faster than the first speed.

4. The exposure method of claim 1, wherein the first and second substrates are irradiated in an exposure area disposed in the working portion which is between the loading portion and the unloading portion, and
    the loading portion, the working portion and the unloading portion are disposed in the first direction in order.

5. The exposure method of claim 4, wherein the first and second substrates are transferred by an air floating stage, and
    first and second grippers hold the first and second substrates to transfer the first and second substrates.

6. The exposure method of claim 5, wherein loading the first substrate comprises:
    moving the first substrate in a second direction substantially perpendicular to the first direction to place the first substrate on the first gripper and to place a side of the first substrate in parallel with the first direction, and aligning the first substrate by rotating the first substrate in a plane which formed by the first and second directions.

7. The exposure method of claim 6, wherein loading the first substrate further comprises:
after aligning the first substrate, rotating the first substrate in the plane to form a predetermined angle between the side of the first substrate and the first direction.

8. The exposure method of claim 1, wherein the first substrate is loaded on a first gripper and the second substrate is loaded on a second gripper.

9. The exposure method of claim 1, further comprising:
irradiating the second substrate by moving the second substrate in the first direction while loading a third substrate on the loading portion.

10. The exposure method of claim 9, further comprising:
irradiating the third substrate by moving the third substrate in the first direction while loading a fourth substrate on the loading portion.

* * * * *